(12) United States Patent
Laster et al.

(10) Patent No.: US 12,181,954 B2
(45) Date of Patent: Dec. 31, 2024

(54) COMPUTING CLUSTER HEALTH REPORTING ENGINE

(71) Applicant: State Farm Mutual Automobile Insurance Company, Bloomington, IL (US)

(72) Inventors: Marcus Laster, Mesa, AZ (US); Robert Whitney, Queen Creek, AZ (US); Logan Ritter, Peoria, AZ (US); James Risoli, Phoenix, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 109 days.

(21) Appl. No.: 17/834,832

(22) Filed: Jun. 7, 2022

(65) Prior Publication Data

US 2022/0391277 A1    Dec. 8, 2022

Related U.S. Application Data

(60) Provisional application No. 63/197,907, filed on Jun. 7, 2021.

(51) Int. Cl.
*G06F 11/07* (2006.01)

(52) U.S. Cl.
CPC ...... *G06F 11/0769* (2013.01); *G06F 11/0709* (2013.01)

(58) Field of Classification Search
CPC ..... H04L 12/4641; H04L 41/12; H04L 41/22; H04L 41/0895; H04L 41/0893; H04L 41/34; G06F 11/3006; G06F 11/0709; G06F 11/0757

See application file for complete search history.

(56) References Cited

U.S. PATENT DOCUMENTS

| 11,323,325 | B1 * | 5/2022 | Hullahalli | H04L 41/0806 |
| 2009/0271504 | A1 * | 10/2009 | Ginter | H04L 63/02 709/220 |
| 2013/0086040 | A1 * | 4/2013 | Patadia | G06Q 10/00 707/E17.014 |
| 2016/0028592 | A1 * | 1/2016 | Takeuchi | H04L 41/0853 715/736 |
| 2019/0296997 | A1 * | 9/2019 | Menon | H04L 69/40 |
| 2021/0168034 | A1 * | 6/2021 | Qian | H04L 12/4641 |

\* cited by examiner

*Primary Examiner* — Mahran Y Abu Roumi
(74) *Attorney, Agent, or Firm* — Lee & Hayes, P.C.

(57) ABSTRACT

A cluster health reporting engine may be a software tool which generates compiled health data reported by data collection hosts, being health data of computing resources of backend computing clusters whose failure during the ordinary course of data query and processing functions may impede the normal functioning of those data query and processing functions. Such techniques may generate compiled health data reported by a data collection host for a particular host of a computing cluster, enabling administrative personnel to quickly narrow specificity of health data reported. Such techniques may aggregate health data reported by a data collection host over a dimension of hosted services, and may configure a reporting sub-system to visualize this aggregated health data, enabling administrative personnel to quickly view storage capacity consumed by various hosted services and identify hosted services or sub-services generating adverse health data by visual highlighting.

17 Claims, 33 Drawing Sheets

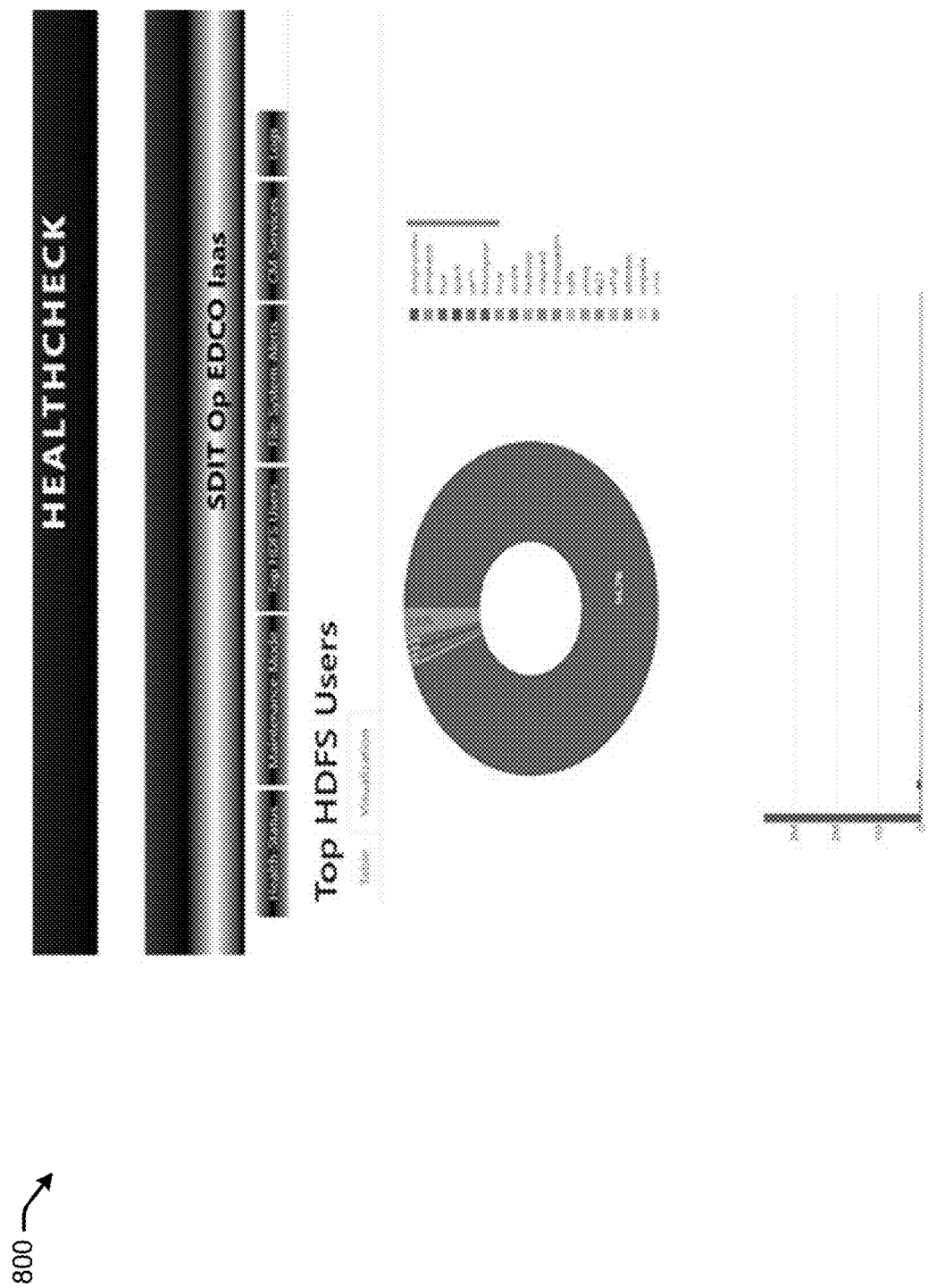

1500

COMPUTING CLUSTER HEALTH REPORTING ENGINE

RELATED APPLICATIONS

This application claims the benefit of and is a non-provisional of U.S. Patent Application No. 63/197,907, filed Jun. 7, 2021, and entitled "COMPUTING CLUSTER HEALTH REPORTING ENGINE," the disclosure of which is incorporated by reference herein in its entirety for all purposes.

BACKGROUND

Enterprise-grade information technology ("IT") systems deployed in a variety of industries, such as insurance services, banking services, medical services, scientific research, and the like, rely upon data storage backends which support storage and querying of massive volumes of data. Increasingly, data storage infrastructure for enterprise applications are not established on-site, where IT administrators are staffed, but instead are remotely distributed over some number of computing clusters. The computing clusters may be configured with distributed file systems and data processing frameworks to enable IT systems to access distributed data to perform functions and services. For example, enterprises commonly deploy the Hadoop® framework from the Apache® Software Foundation as a framework for remotely storing and processing data at large scales.

Additionally, in some enterprises, IT systems are divided into many sub-systems which may each be configured to store and retrieve data at a different remote computing cluster. Consequently, the remote distribution of multiple data storage systems across computing clusters may segregate a number of databases maintained by an enterprise across multiple disparate, and differently-configured, hardware systems running differently-configured software frameworks. For IT administrative personnel tasked with maintaining the ongoing stability and functionality of enterprise IT systems, it is challenging to concurrently track the performance and health of many computing clusters on an ongoing basis.

Furthermore, it is common for failures of computing clusters to be detected only after their occurrence, resulting in system downtime, and loss of functionality and service availability during remediation of the failures. While computing cluster performance and health metric data is generally available to IT administrative personnel who present authorized and authenticated credentials to the IT system, such data can generally only be reviewed and monitored on an on-demand basis by manual retrieval. Since it is impractical and inefficient to frequently retrieve metric data at intervals to monitor computing cluster performance and health, particularly without any motivation to suspect that failures may be developing, the duties of IT personnel administrating multiple computing clusters remains challenging in various industries.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 8A through 8H illustrate views of a cluster health summary interface according to example embodiments of the present disclosure.

DETAILED DESCRIPTION

Data collection and data processing are central to decision-making, business analysis, design of products and services, market research, recordkeeping, due diligence and compliance, and many other crucial functions of modern-day enterprises in all industries. Due to the massive scale of data which may be collected and generated in the ordinary course of conducting business, data storage and processing functionalities are commonly hosted at remote sites, such as data centers, which may host distributed file systems and data processing frameworks running on one or more computing clusters.

Figure 1:
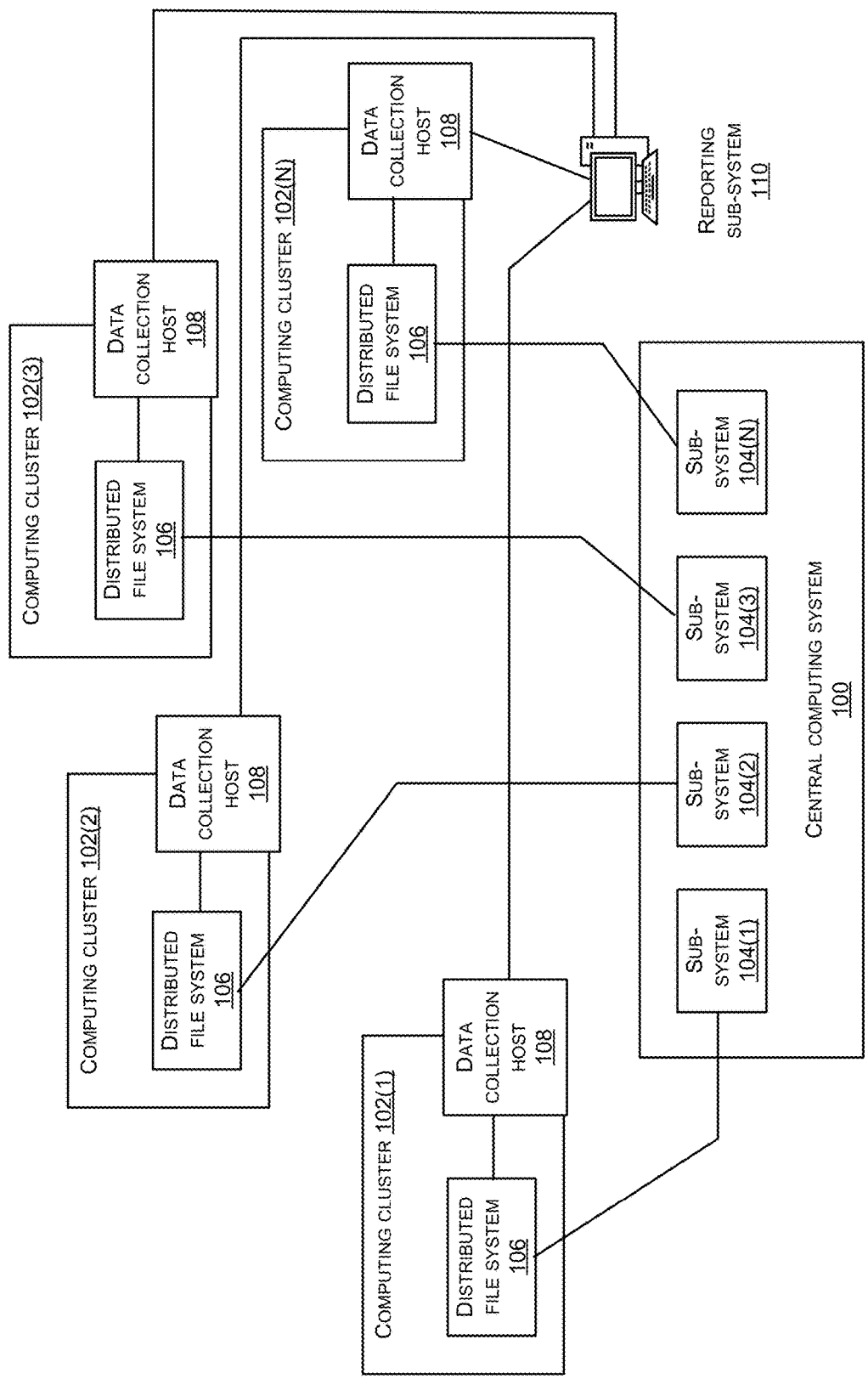
FIG. 1 illustrates an architectural diagram of multiple computing clusters providing distributed file systems for a central computing system.

FIG. 1 illustrates an architectural diagram of multiple computing clusters providing distributed file systems for a central computing system. At an enterprise, administrative personnel may configure a central computing system 100 in communication with the one or more computing clusters 102(1), 102(2), . . . , 102(N), such that a central computing system 100 may communicate with multiple computing clusters 102. The central computing system 100 may be located physically and logically apart from the multiple computing clusters 102, and at least some of the multiple computing clusters 102 may be located physically and logically apart from each other. Physically, the central computing system 100 and the multiple computing clusters 102 may be set apart by geographical distance, and may be located in different cities, in different administrative subdivisions, in different countries, on different continents, and the like. Logically, the central computing system 100 and the multiple computing clusters 102 may be set apart by being configured as part of different computer networks, such as personal area networks ("PANs"), wired and wireless local area networks ("LANs"), wired and wireless wide area networks ("WANs"), and so forth. In short, inter-network communication over distances may be required to communicate between the central computing system 100 and the multiple computing clusters 102.

At the enterprise, administrative personnel may configure the central computing system to include multiple sub-systems 104(1), 104(2), . . . , 104(N). Each sub-system 104 may include computing resources such as physical and/or virtual processors, memory, storage, computer-executable instructions, computer-readable data, and the like. Among such computer-executable instructions, each sub-system 104 may include one or more computer-executable applications, database frontends, platforms, services, virtual machines, and the like.

In this manner, each sub-system 104 may run computational resources supporting a different data query application or service; data analytics application or service; data warehousing application or service; or otherwise any interactive frontend running on a computing system, configuring the computing system to be operative by administrative personnel to query, analyze, and/or warehouse a different massive dataset stored at a different computing cluster backend. Different massive datasets may support decision-making tasks, business analysis tasks, product or service design tasks, market research tasks, recordkeeping tasks, due diligence and compliance tasks, and other such tasks which need to be performed in the ordinary course of business.

Each sub-system 104 may be configured to call interfaces of a distributed file system 106 running on a respective computing cluster 102 to retrieve data which may be stored in a distributed fashion across some number of storage hosts (for simplicity, FIG. 1 not illustrating individual storage hosts) of a computing cluster 102. Each storage host may include computing resources such as physical and/or virtual processors, memory, storage, computer-executable instructions, computer-readable data, and the like. Subsequently, for brevity, a respective computing cluster 102 servicing a sub-system 104 may be referenced as a "backend cluster" of the sub-system 104.

The distributed file system 106 may further be configured to provide a data processing framework, the data processing framework including an application programming interface ("API") which is configured to handle queries, data processing commands, parallel and distributed computing commands, and other such functions (subsequently referenced as "data query and processing functions") which may be invoked by a sub-system 104 making calls to the API of the data processing framework. For example, the distributed file system 106 may be one of many implementations of the Hadoop® framework created by the Apache® Software Foundation, which may furthermore support parallel and distributed computing commands through the MapReduce programming framework. An example of such an implementation may be Cloudera®, implemented by CLOUDERA, INC. of Palo Alto, California.

While a backend cluster is online and is not suffering from substantial performance degradation as to its computing resources, the backend cluster may service data query and processing functions of a respective sub-system 104 effectively. Upon any number of hosts of the backend cluster malfunctioning, suffering performance degradation, or otherwise ceasing to function normally for various reasons, data query and processing functions of the sub-system 104 may fail, or may perform sub-optimally.

In conjunction with each computing cluster 102, a data collection host 108 may host a health monitoring interface and a health monitoring service. The data collection host 108 (which may be one or more hosts of the computing cluster 102 or may be physically and/or logically external to the computing cluster 102), may run the health monitoring service concurrent to the operation of the distributed file system 106, and, as part of the health monitoring service, may run various health tests on an ongoing basis, each health test configuring the data collection host 108 to track health data of one or more computing resources of hosts of the computing cluster 102. In particular, the data collection host 108 may track respective health data of computing resources whose failure during the ordinary course of data query and processing functions at a sub-system 104 may impede the normal functioning of those data query and processing functions.

For example, a first health test may configure the data collection host 108 to track a startup status of one or more hosts of a computing cluster 102 (i.e., whether each of the respective one or more hosts has started up successfully, or has failed to start up); a second health test may configure the data collection host 108 to track storage capacity of one or more hosts of a computing cluster 102 (i.e., whether storage capacity at the one or more hosts is adequate for performing data query and processing functions, or whether storage capacity at the one or more hosts is inadequate for such purposes); a third health test may configure the data collection host 108 to track network connectivity of one or more hosts of a computing cluster 102 (i.e., whether bandwidth and packet transport speed between the respective one or more hosts and a public network, such as the Internet, is adequate for network communications necessary for performing data query and processing functions, or is inadequate for such network communications; or, whether a network connection between the respective one or more hosts and a public network is down and unable to transport network traffic); and so on.

Broadly, the multiple health tests may include binary tests and metric tests. A binary test may be a test which configure the data collection host 108 to determine either a positive or negative outcome. A negative outcome (referring to an outcome which is non-indicative of any significant observations, rather than an adverse outcome) may indicate that a computing resource of one or more hosts of a computing cluster 102 has not failed, while a positive outcome (referring to an outcome which is indicative of a significant observation, rather than a non-adverse outcome) may indicate that a computing resource of one or more hosts of a computing cluster 102 has failed. Thus, a binary test may configure the data collection host 108 to be operative to detect outright failures of a computing resource after their occurrence. However, prior to the occurrence of such failures, binary tests may consistently return negative outcomes, and thereby may provide no information to preemptively indicate that a failure will occur.

A metric test may be a test which configure the data collection host 108 to measure behavior of one or more computing resources according to a numerical scale. Rather than determine binary outcomes, a metric test may report a measured value of a measured behavior, such as uptime of one or more hosts of a computing cluster 102; storage capacity of one or more hosts of a computing cluster 102 (such as total storage capacity, utilized storage capacity, and remaining storage capacity); bandwidth consumption of a connection between one or more hosts of a computing cluster and a public network; packet transport speed between one or more hosts of a computing cluster and a public network; and the like. Furthermore, a metric test may compare a measured value to some number of numerical thresholds, and characterize the measured value in accordance with an upper threshold and/or a lower threshold which bound the measured value. For example, given two numerical thresholds, one higher and one lower, a measured value higher than the higher threshold may be characterized as "high"; a measured value bounded by the two thresholds may be characterized as "medium"; and a measured value lower than the lower threshold may be characterized as "low."

The health monitoring interface may be callable by a sub-system 104 to configure the data collection host 108 to report a measured value of a measured behavior and/or a characterization of the measured value over a network connection, enabling the sub-system 104 to retrieve the measured value and/or the characterization of the measured value. Thus, the health monitoring interface may configure the data collection host 108 to report measured values and/or characterizations of those measured values in an aggregated fashion over various dimensions, as shall be described in further detail subsequently.

Unlike binary tests, metric tests may configure a data collection host 108 to report information which may be reviewed by administrative personnel, operating a central computing system 100 in communication with many computing clusters 102, to evaluate the health of each computing cluster 102 on an ongoing basis. The administrative personnel may display reported information from data collection hosts 108 aggregated across various dimensions, as shall be described subsequently. By reviewing such aggregations, the administrative personnel may identify performance degradation, malfunctions, or imminent failure at certain computing clusters 102 for various computing resources, and may localize causes of performance degradation, malfunctions, or imminent failure at particular computing resources of particular backend clusters (subsequently, any health data indicating such conditions may be referred to as "adverse health data," for short), enabling administrative personnel to operate the central computing system 100 to enact remedial actions. In this manner, outright failures of backend clusters servicing data query and processing functions of sub-systems 104 may be averted by application of remedial actions in a timely and targeted fashion, based on autonomous and aggregated reporting of health data of multiple computing clusters 102, as opposed to on-demand manual retrieval of health data. Thus, example embodiments of the present disclosure provide a cluster health reporting engine running on a central computing system 100.

According to example embodiments of the present disclosure, a cluster health reporting engine may be a software tool which generates compiled health data reported by data collection hosts 108, aggregates health data across dimensions, and renders multiple views representing the aggregated health data. The cluster health reporting engine may run on a reporting sub-system 110 of the central computing system 100, the reporting sub-system 110 providing at least input and output interfaces. The cluster health reporting engine may configure the reporting sub-system 110 to display any number of rendered views through an output interface. The cluster health reporting engine may configure an input interface of the reporting sub-system 110 to enable administrative personnel operating the reporting sub-system 110 to switch between various views of aggregated data across dimensions (as shall be described subsequently), input filtering commands (as shall be described subsequently), input configuring commands (as shall be described subsequently), and input remediation commands (as shall be described subsequently).

The reporting sub-system 110 may also provide communication interfaces with distributed file systems 106 of respective backend clusters of each sub-system 104, so that the cluster health reporting engine is configured to send configuring commands and remediation commands, such as command line instructions ("CLIs"), to each respective distributed file system 106, in order to configure the distributed file system on each respective backend cluster in accordance with configuring commands, and in order to cause each respective backend cluster to perform enacted remediation commands.

Where the communication interfaces are network interfaces with hosts on a network, commands may be representational state transfer ("REST") application programming interface ("API") commands, such as WebHDFS according to Hadoop® implementations, or may be non-REST API commands, such as HttpFS API commands according to Hadoop® implementations. Where commands are implemented as REST API commands, the cluster health reporting engine may be configured to send configuring commands and remediation commands to one host among a computing cluster 102. Where commands are implemented as REST API commands, the cluster health reporting engine may be configured to send configuration commands and remediation commands to one host among a computing cluster 102. Where commands are implemented as non-REST API commands, the cluster health reporting engine may be configured to send configuration commands and remediation commands to each host among a computing cluster 102.

A distributed file system 106 may be configured to implement configuring commands and remediation commands by sending instructions to computing resources of hosts of a computing cluster 102 over device-to-device communication interfaces. Device-to-device communication interfaces may include, for example, input/output ("I/O") pins on microprocessors, control buses on CPUs, data buses of computing systems, network interfaces, Universal Serial Bus ("USB") interfaces, Peripheral Component Interconnect ("PCI") bus interfaces, Small Computer System Interface ("SCSI") bus interfaces, Fiber Channel ("FC") bus interfaces, Peripheral Component Interconnect Express ("PCIe") bus interfaces, and any other suitable interfaces for device-to-device communication as known to persons skilled in the art.

In general, a reporting sub-system 110 may be operated by administrative personnel to retrieve health data of computing clusters 102, aggregated over various dimensions, to assist in manual reasoning to identify performance degradation, malfunctions, or imminent failure at certain computing clusters 102 for various computing resources. The administrative personnel may implement commands to alter configuration of computing resources of hosts of those computing clusters, and/or to return malfunctioning or imminently failing computing resources of hosts of those computing clusters to normal functionality, thereby averting performance degradation and outright failure which would lead to loss of data query and processing functions.

It should be understood that administrative personnel generally access a cluster health reporting engine running on a reporting sub-system 110 by entering security credentials in accordance with a security protocol, such as, for example, Lightweight Directory Access Protocol ("LDAP"). Since access to the cluster health reporting engine entails gaining access to data stored on computing clusters 102 which may be sensitive and protected in nature, administrative personnel may be required to input security credentials at the reporting sub-system 110, which may be communicated over a network connection under encryption (such as encryption implemented according to the Transport Layer Security ("TLS") protocol) to an authentication server which, in accordance with LDAP, authenticates the security credentials and grants access to the cluster health reporting engine on the reporting sub-system 110. In such a manner, the reporting sub-system 110 may implement a level of security concomitant with the security of the computing clusters 102.

Figure 2:
FIG. 2 illustrates a registration interface by which administrative personnel may register security credentials to be authenticated in accordance with LDAP.

FIG. 2 illustrates a registration interface 200 by which administrative personnel may register security credentials to be authenticated in accordance with LDAP.

Figures 3A, 3B:
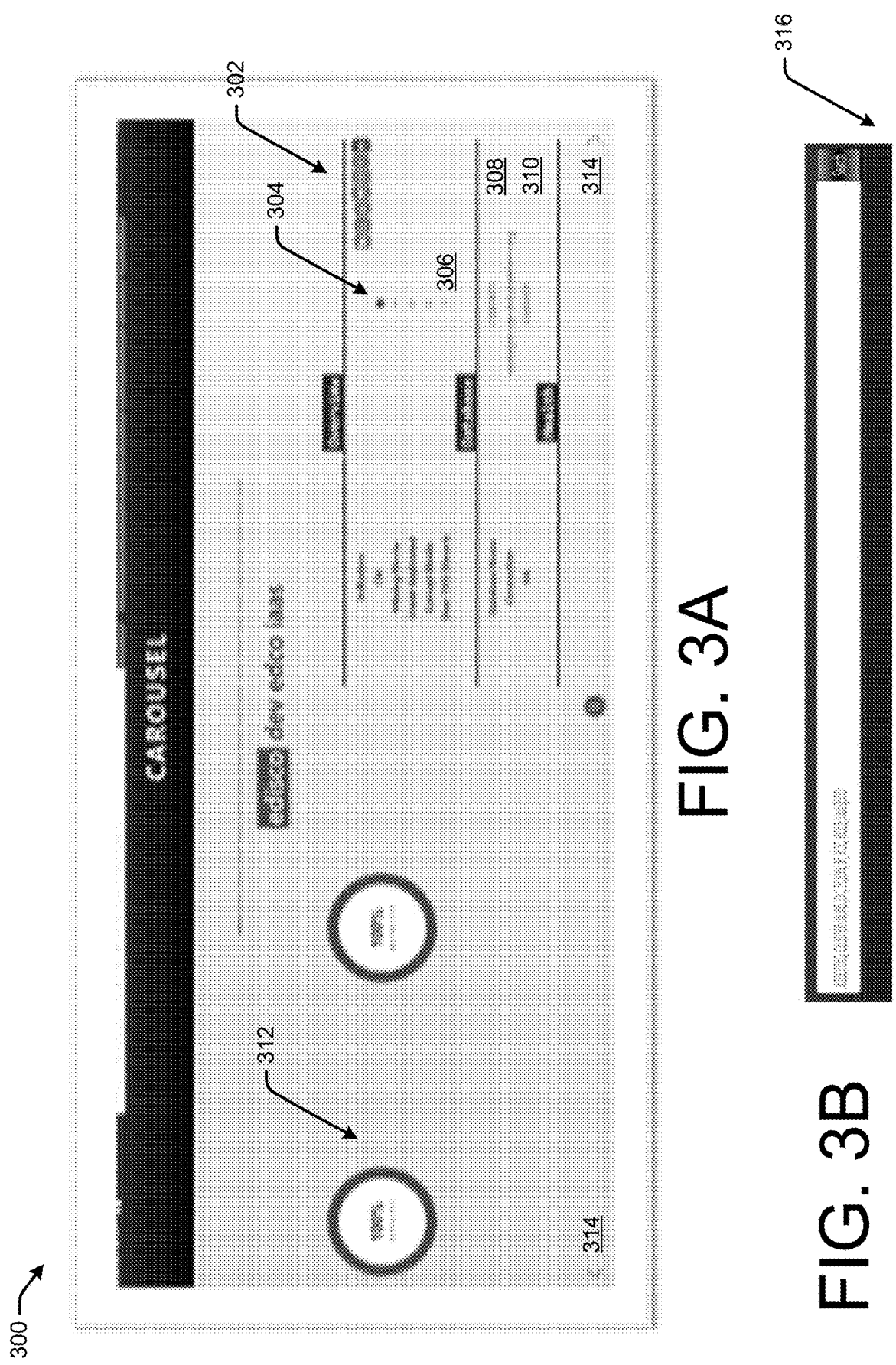
FIG. 3A illustrates an overview interface according to example embodiments of the present disclosure.
FIG. 3B illustrates a search interface which may be further included in the overview interface.

FIG. 3A illustrates an overview interface 300 according to example embodiments of the present disclosure. The overview interface 300 includes user visual indicators 302, block health indicators 304, mount point health indicators 306, database identifiers 308, service health indicators 310, system update indicators 312, and view switching controls 314.

It should be understood that the overview interface 300 configures the reporting sub-system 110 to display, on an output interface, condensed overviews of health data returned from a data collection host 108 for a single computing cluster 102 at a time. The overview interface 300 may configure the reporting sub-system 110 to rotate, on an output interface, through overviews of health data returned from different data collection hosts 108 for different computing clusters 102 in response to administrative personnel operating an input interface of the reporting sub-system 110 to activate the switching controls 314.

The visual indicators 302 may include any number of indicators regarding statuses of individual tenant users having registered access to a computing cluster 102. It should be understood that a distributed file system 106 generally supports multitenancy, wherein data of multiple users is stored and queried by a single instance of the distributed file system 106 at the same computing cluster 102, as known to persons skilled in the art. Visual indicators 302 may configure the reporting sub-system 110 to display, on an output interface, a summary of information regarding any individual tenant user, including user-specific alerts from the distributed file system 106, user workgroups, cluster type, user contact information, and storage capacity allocated to a user. In particular, visual indicators 302 may visually highlight that a user has stored data nearing allocated storage capacity at the computing cluster 102. Administrative personnel may operate an input interface to activate the visual indicators 302 to expand the summarized information shown therein.

On host storage of computing clusters 102, data may be stored as logical blocks of a predetermined size. Thus, block health indicators 304 may configure the reporting sub-system 110 to display, on an output interface, whether any blocks of host storage of a computing cluster 102 are missing; whether any blocks of host storage of a computing cluster 102 are insufficiently replicated across hosts to ensure efficient read and write access; whether any blocks of host storage of a computing cluster 102 are corrupt; and other such health data relating to blocks of host storage of a computing cluster 102.

Storage of computing clusters 102, beyond host storage, may be expanded by mounting storage outside of the hosts to the distributed file system 106. Thus, mount point health indicators 306 may configure the reporting sub-system 110 to display, on an output interface, whether utilized mount points of the storage of computing clusters 102 are approaching capacity set by a distributed file system 106 (such as over 70%).

The database identifiers 308 may configure the reporting sub-system 110 to display, on an output interface, identifiers and characteristics of a database configured on storage of a computing cluster 102 by the distributed file system 106, such as a database name; a database connection hostname; and whether a database is high availability, each configured in accordance with implementations of Hadoop®.

The distributed file system 106 may configure various hosted services, which may each be configured to monitor its own service health data, and communicate this service health data to the data collection host 108. Thus, the service health indicators 310 may display summaries of any adverse service health data reported by the data collection host 108 in this manner.

Hosts of the computing cluster 102 may each require BIOS and operating system ("OS") updates in order to function optimally. Thus, the system update indicators 312 may indicate how many hosts, among all hosts of the computing cluster 102, are running a fully updated BIOS, and how many hosts, among all hosts of the computing cluster 102, are running a fully updated OS.

FIG. 3B illustrates a search interface 316 which may be further included in the overview interface 300. The search interface 316 may configure the reporting sub-system 110 to generate compiled health data compiled with reference to a particular host of a computing cluster 102 in response to administrative personnel operating an input interface of the reporting sub-system 110 to input search parameters into the search interface 316 to perform a search for health data of a particular host of the computing cluster 102. The search parameters may include, for example, an IP address of a particular host; an asset tag of a particular host; part or the entirety of the hostname of a particular host; a server type of a particular host; a hardware serial number of a particular host; and/or a cluster family of a particular host.

Figure 4:
FIG. 4 illustrates a host health data view interface according to example embodiments of the present disclosure.

FIG. 4 illustrates a host health data view interface 400 according to example embodiments of the present disclosure. The health data view interface 400 may configure the reporting sub-system 110 to display, on an output interface, compiled health data of a particular host of the computing cluster 102. In this fashion, the cluster health reporting engine may compile health data reported by a data collection host 108 for a particular host of a computing cluster 102, enabling administrative personnel to quickly narrow specificity of health data reported, and easily access, copy, and share a copy of narrowed health data for the benefit of collaborative work among various personnel.

Figure 5A:
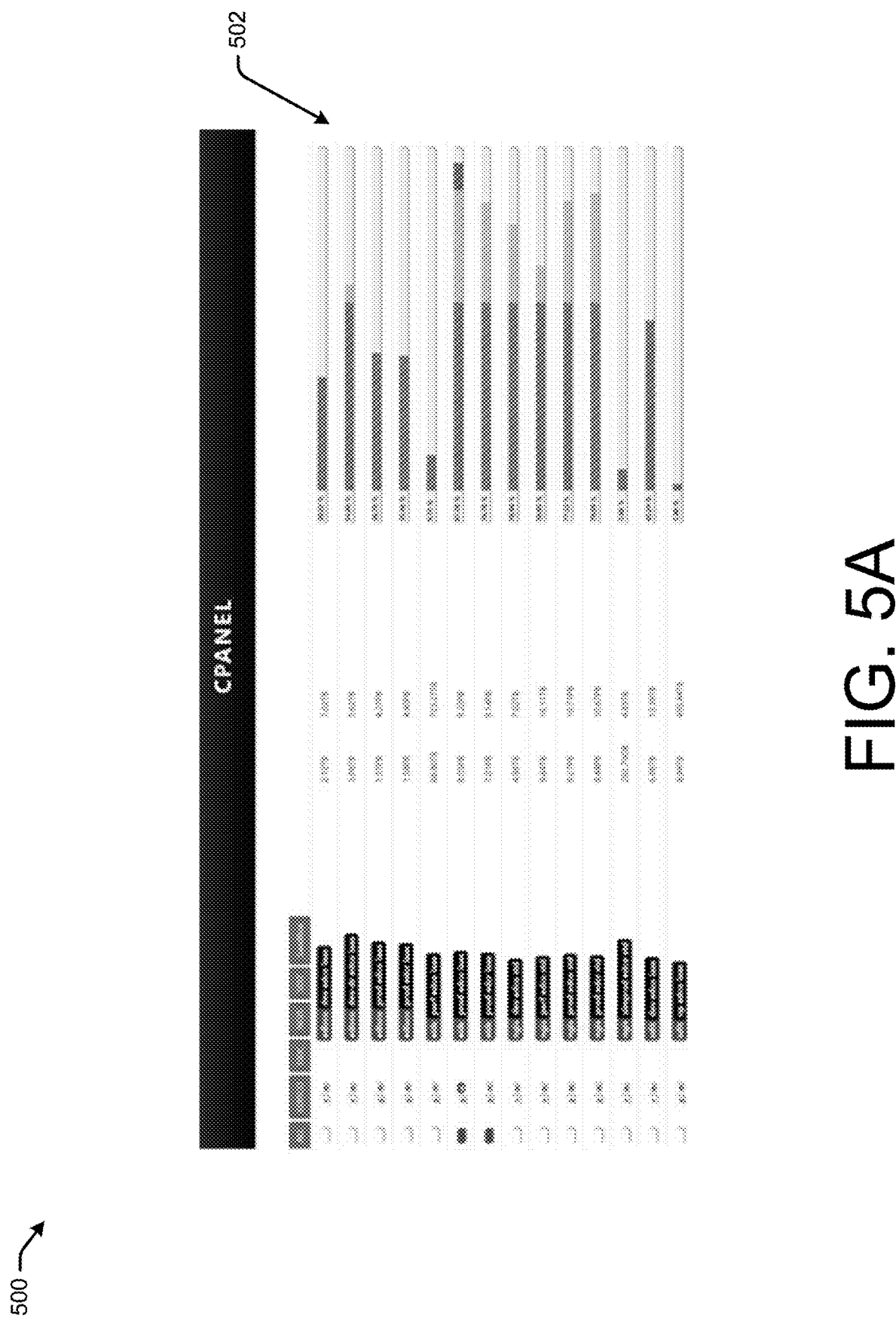
FIGS. 5A and 5B illustrate examples of a hosting capacity view interface according to example embodiments of the present disclosure.
Figure 5B:
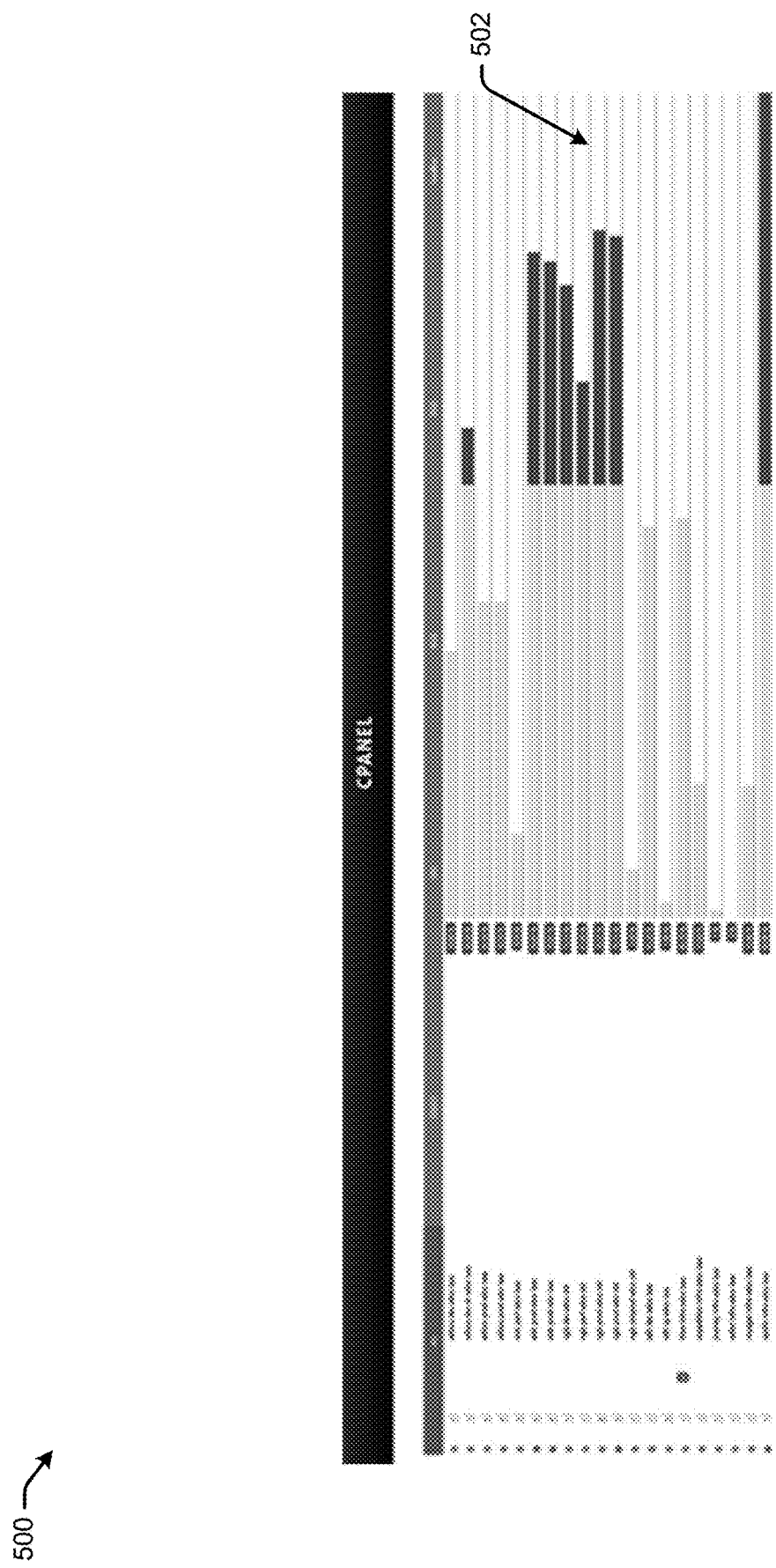

FIGS. 5A and 5B illustrate examples of a hosting capacity view interface 500 according to example embodiments of the present disclosure. The hosting capacity view interface 500 may configure the reporting sub-system 110 to display, on an output interface, service capacity gauges 502, each indicating a hosted service of the distributed file system 106, as described above. Each service capacity gauge 502 may identify a hosted service of the distributed file system 106, or a sub-service of a hosted service, by its name; may list an allocated storage capacity of the hosted service or sub-service; may list a utilized storage capacity by the hosted service or sub-service; and may visualize the utilized storage capacity as one or more segments within the allocated storage capacity.

The one or more segments may include a below-average capacity segment; an above-average capacity segment; and an approaching full capacity segment. While utilized storage capacity by a hosted service or sub-service is below average utilization, part or all of the below-average capacity segment may be visualized, without visualizing any other segment; while utilized storage capacity is above average utilization without approaching full capacity, part or all of the above-average capacity segment may additionally be visualized; and while utilized storage capacity is approaching or at full capacity, part or all of the approaching full capacity segment may additionally be visualized. The above-described three segments may be visualized in progressively more urgent colors, such as progressing from green to yellow to read, or progressing from light to dark to a highlighted color.

In this fashion, the cluster health reporting engine may aggregate health data reported by a data collection host 108 over a dimension of hosted services, and may configure a reporting sub-system 110 to visualize this aggregated health data, enabling administrative personnel to quickly view storage capacity consumed by various hosted services and identify hosted services or sub-services generating adverse health data by visual highlighting.

FIGS. 6A through 6E illustrate a configuration retrieval and editing interface 600 according to example embodiments of the present disclosure. The configuration retrieval and editing interface 600 may configure the reporting sub-system 110 to retrieve a host configuration file of one or more hosts of a computing cluster 102 (which, as described above, may be one host in the case of retrieval by calling a REST API, and may be multiple hosts in the case of retrieval by calling a non-REST API), parse configuration parameters of the host configuration file, and visualize a parameter editing view of the host configuration file, in response to administrative personnel operating an input interface of the reporting sub-system 110 to input narrowing parameters into the configuration retrieval and editing interface 600.

According to example embodiments of the present disclosure, the host configuration file may be formatted according to a text markup language known to persons skilled in the art as operative to format configuration files, such as JavaScript Object Notation ("JSON"), Extensible Markup Language ("XML"), YAML, and the like.

Furthermore, the configuration retrieval and editing interface 600 may configure the reporting sub-system 110 to save an edited host configuration file and send the edited host configuration file to the one or more hosts of the computing cluster 102 (which, as described above, may be one host in the case of sending by calling a REST API, and may be multiple hosts in the case of sending by calling a non-REST API), thereby causing the host to operate in accordance with configuration parameters of the edited host configuration file (rather than configuration parameters of the originally retrieved host configuration file) in response to administrative personnel operating an input interface of the reporting sub-system 110 to edit one or more configuration parameters of the host configuration file in the parameter editing view.

Figure 6A:
FIGS. 6A through 6E illustrate a configuration retrieval and editing interface according to example embodiments of the present disclosure.
Figure 6B:
Figure 6C:
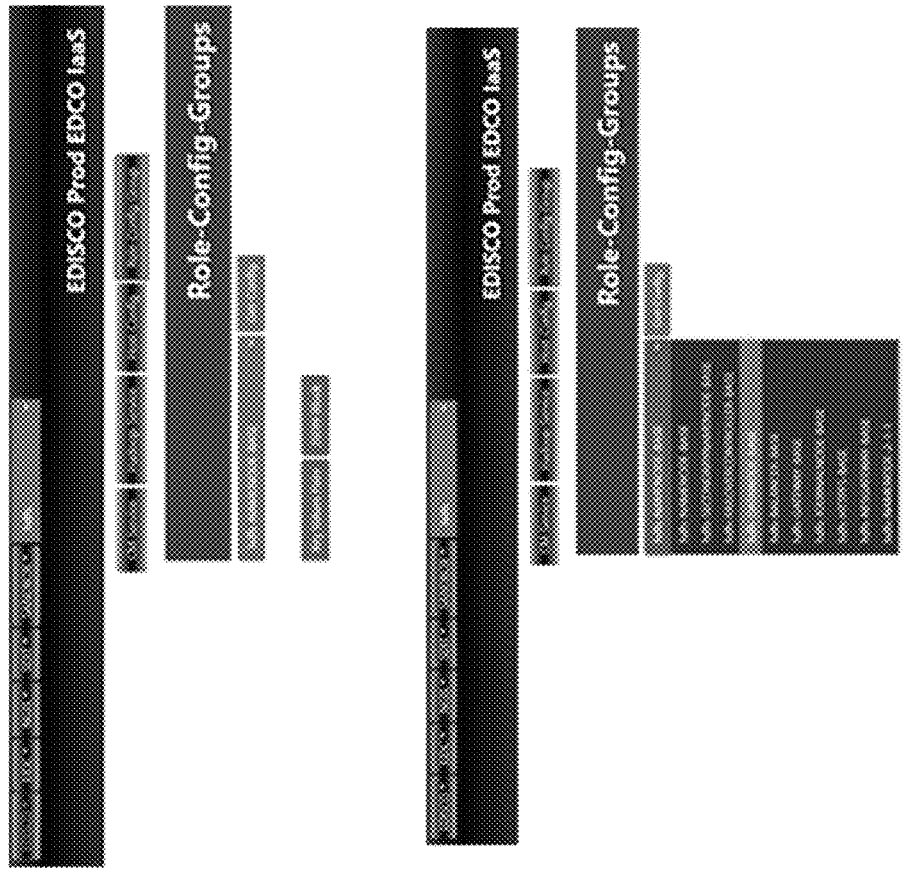

FIGS. 6A through 6C illustrate views of the configuration retrieval and editing interface 600 which configure the reporting sub-system 110 to enable administrative personnel to operate an input interface of the reporting sub-system 110 to input narrowing parameters into the configuration retrieval and editing interface 600. It may be seen that, starting from FIG. 6A and progressing through FIG. 6C, the narrowing parameters on each view become progressively narrower. On FIG. 6A, no narrowing parameter is selected; on FIG. 6B, a selected narrowing parameter is an identifier of a computing cluster 102 among several computing clusters; on FIG. 6C, after an identifier of a computer cluster 102 has already been selected as a narrowing parameter, a selected further narrowing parameter is an identifier of a hosted service on one or more hosts of the computing cluster 102.

Figure 6D:
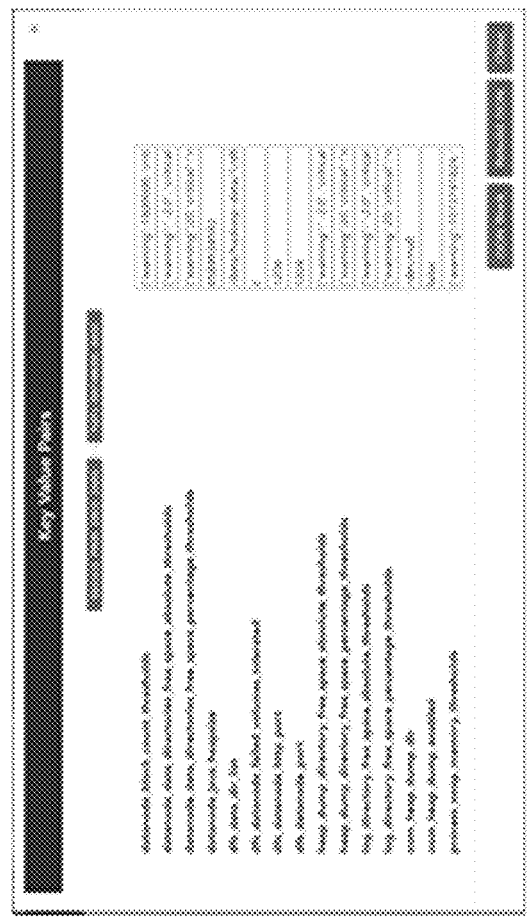

After administrative personnel have operated an input interface of the reporting sub-system 110 to select narrowing parameters from multiple views of the configuration retrieval and editing interface 600, the configuration retrieval and editing interface 600 retrieves a host configuration file from one or more hosts (as described in further detail above with regard to either a REST API or a non-REST API) of a computing cluster 102, parses configuration parameters of the host configuration file, and configures the reporting sub-system 110 to visualize a parameter editing view of the host configuration file, as illustrated in FIG. 6D, where each of the parsed configuration parameters of the host configuration file is in an editable field of the parameter editing view.

Figure 6E:
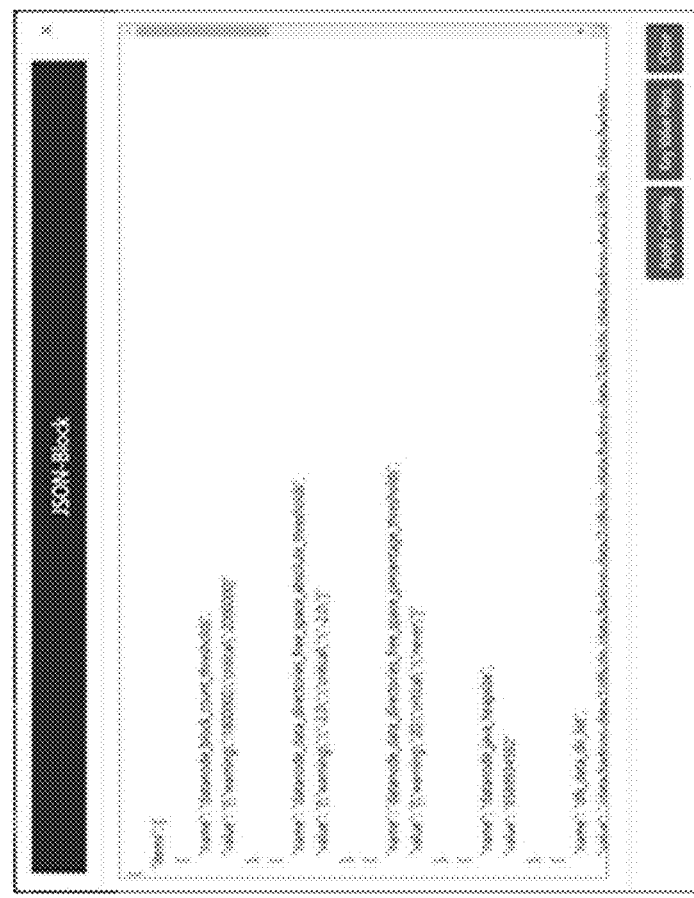

Administrative personnel may then operate an input interface of the reporting sub-system 110 to edit any number of configuration parameters in editable fields of the parameter editing view of the configuration retrieval and editing interface 600. The configuration retrieval and editing interface 600 may then generate an edited host configuration file and display the edited host configuration file in a configuration file review view of the configuration retrieval and editing interface 600, as illustrated in FIG. 6E.

In response to administrative personnel operating an input interface of the reporting sub-system 110 to approve the edited host configuration file, the configuration retrieval and editing interface 600 may configure the reporting sub-system 110 to send the edited host configuration file to the one or more hosts of the computing cluster 102 (which, as described above, may be one host in the case of sending by calling a REST API, and may be multiple hosts in the case of sending by calling a non-REST API), thereby causing the host to operate in accordance with configuration parameters of the edited host configuration file (rather than configuration parameters of the originally retrieved host configuration file).

In this fashion, the cluster health reporting engine may configure the reporting sub-system 110 to pull host configuration files pertinent to particular hosted services on a computing cluster 102, and enable local editing of the configuration files, parsed such that configuration parameters are individually editable. The cluster health reporting engine may further configure the reporting sub-system 110 to push edited configuration files to the computing cluster. Thus, administrative personnel may readily reconfigure each computing cluster 102 while working from the central computing system 100.

FIGS. 7A through 7F illustrate views of a hosted service management interface 700 according to example embodiments of the present disclosure. Broadly, the hosted service management interface 700 may configure the reporting sub-system 110 to initialize and terminate any, some, or all hosted services running on a computing cluster 102.

Figure 7A:
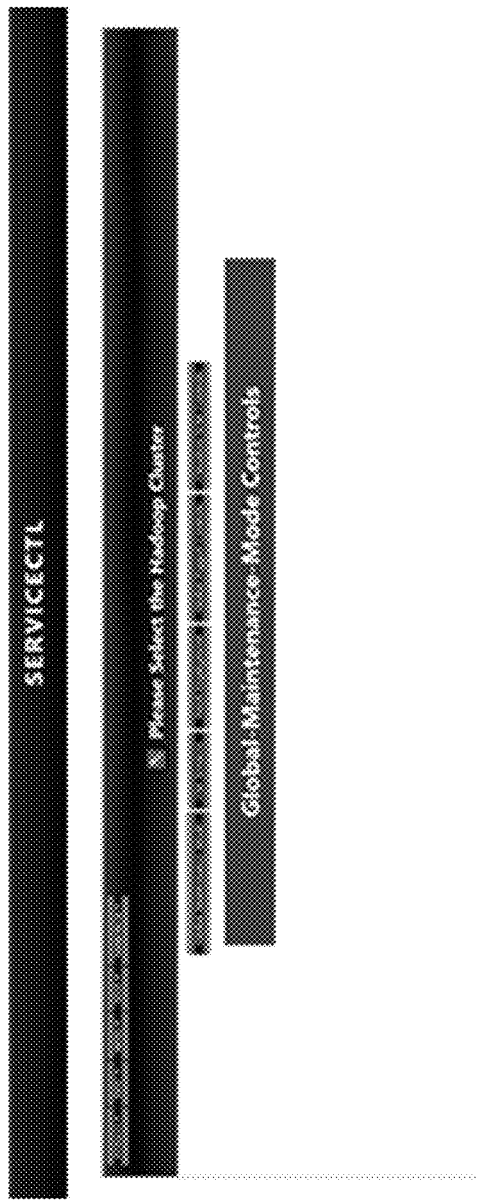
FIGS. 7A through 7F illustrate views of a hosted service management interface according to example embodiments of the present disclosure.
Figure 7A:

FIG. 7A illustrates a cluster selection view of the hosted service management interface 700. The hosted service management interface 700 may configure the reporting sub-system 110 to display one of the other views of the hosted service management interface 700 in response to administrative personnel operating an input interface of the reporting sub-system 110 to select a computing cluster 102 among multiple, and to select a set of controls to operate for the selected computing cluster 102.

Figure 7B:
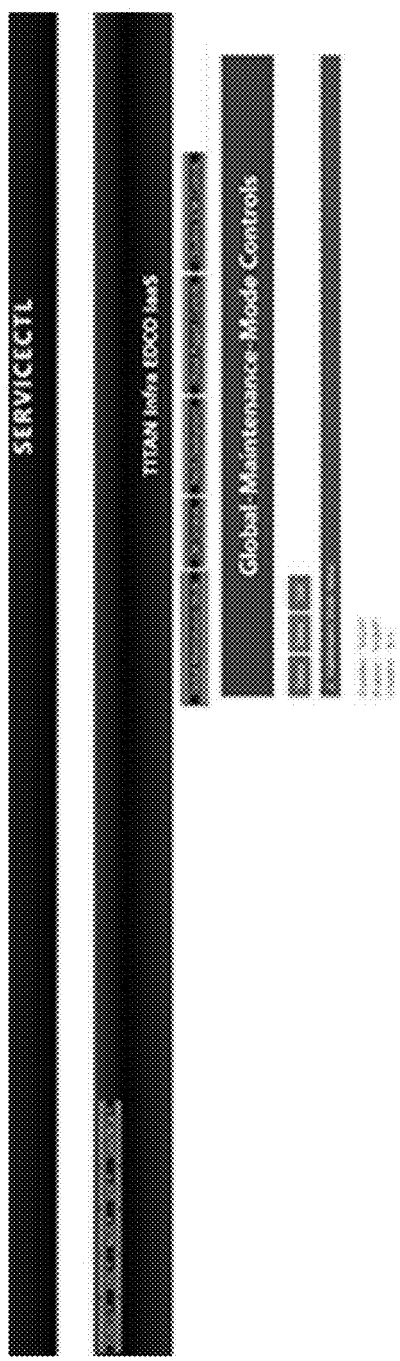

FIG. 7B illustrates a management mode view of the hosted service management interface 700. The hosted service management interface 700 may configure the reporting sub-system 110 to display whether a selected computing cluster 102 is running in maintenance mode or not, and to configure the selected computing cluster 102 (by calls to REST APIs or non-REST APIs, as described above) to run in maintenance mode or to stop running in maintenance mode in response to administrative personnel operating an input interface of the reporting sub-system 110 to select a maintenance mode start control or a maintenance mode stop control, respectively.

Figure 7C:
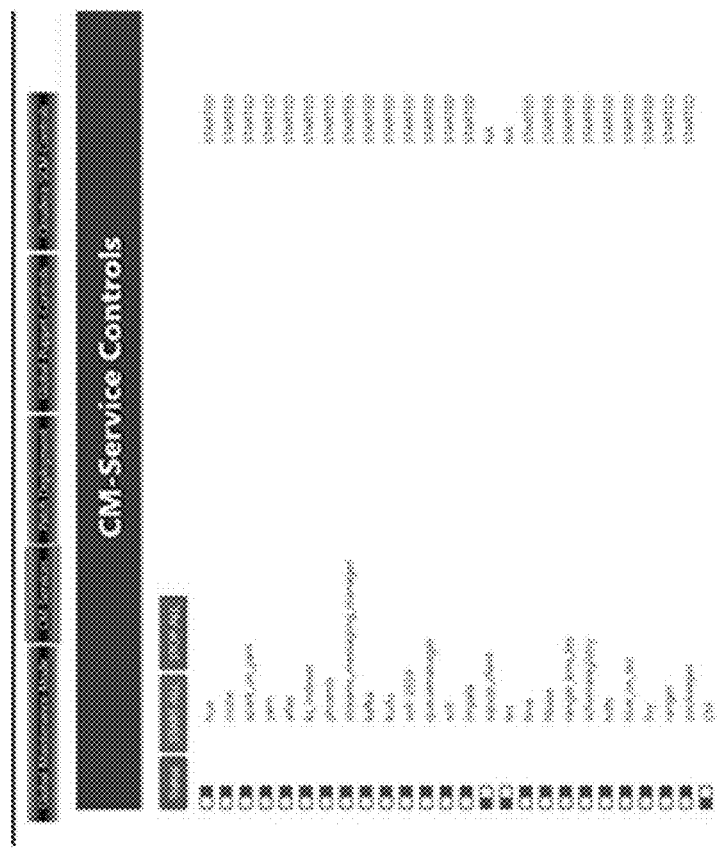

FIG. 7C illustrates a service control view of the hosted service management interface 700. The hosted service management interface 700 may configure the reporting sub-system 110 to display whether each hosted service running on the selected computing cluster 102 is running or not, and to configure each hosted service running on the selected computing cluster 102 (by calls to REST APIs or non-REST APIs, as described above) to start running or to stop running in response to administrative personnel operating an input interface of the reporting sub-system 110 to select a respective control corresponding to that hosted service.

Figure 7D:
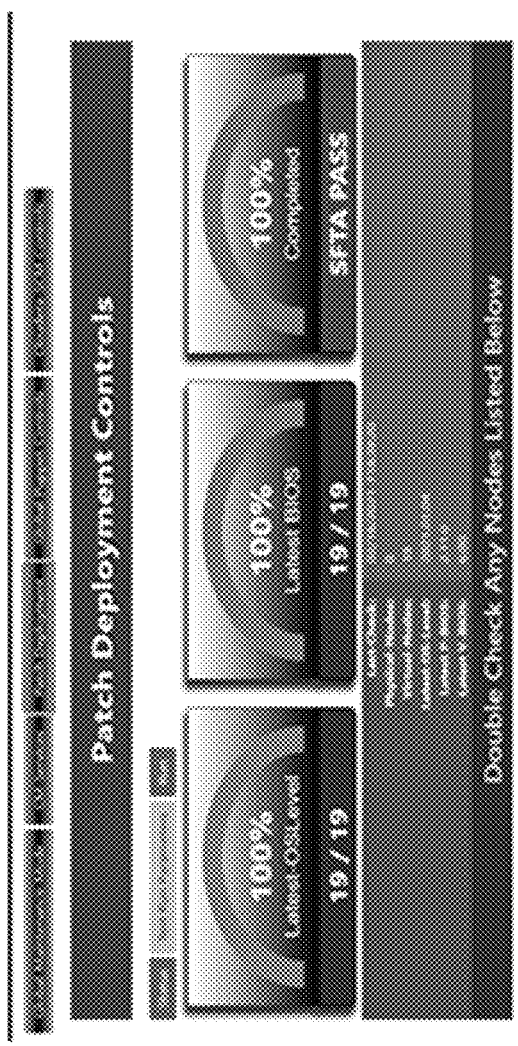
Figure 7D:

FIG. 7D illustrates a patch deployment control view of the hosted service management interface 700. The hosted service management interface 700 may configure the reporting sub-system 110 to display how many hosts, among all hosts of the computing cluster 102, are running a fully updated BIOS, and how many hosts, among all hosts of the computing cluster 102, are running a fully updated OS; to run test suites upon the hosts of the computing cluster 102 to determine which hosts are fully updated in each regard in response to administrative personnel operating an input interface of the reporting sub-system 110 to select a test run control; and to configure each host of the selected computing cluster 102 (by calls to REST APIs or non-REST APIs, as described above) to install patches, in response to administrative personnel operating an input interface of the reporting sub-system 110 to select a patch install control.

Figure 7E:
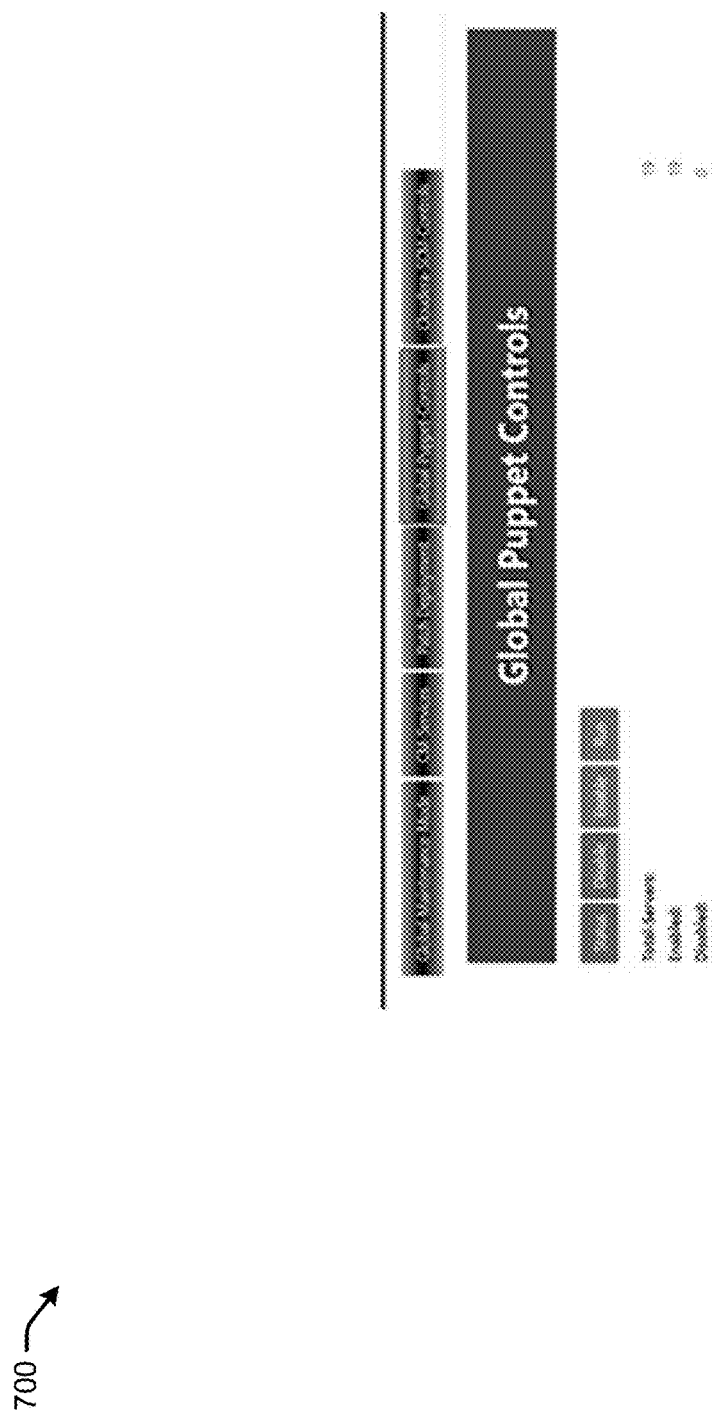

FIG. 7E illustrates a Puppet® control view of the hosted service management interface 700. The hosted service management interface 700 may configure the reporting sub-system 110 to display whether a Puppet® service is running on the selected computing cluster 102, and to configure a Puppet® service on the selected computing cluster 102 (by calls to REST APIs or non-REST APIs, as described above) to start running or to stop running in response to administrative personnel operating an input interface of the reporting sub-system 110 to select a Puppet® start control or a Puppet® stop control, respectively.

Figure 7F:
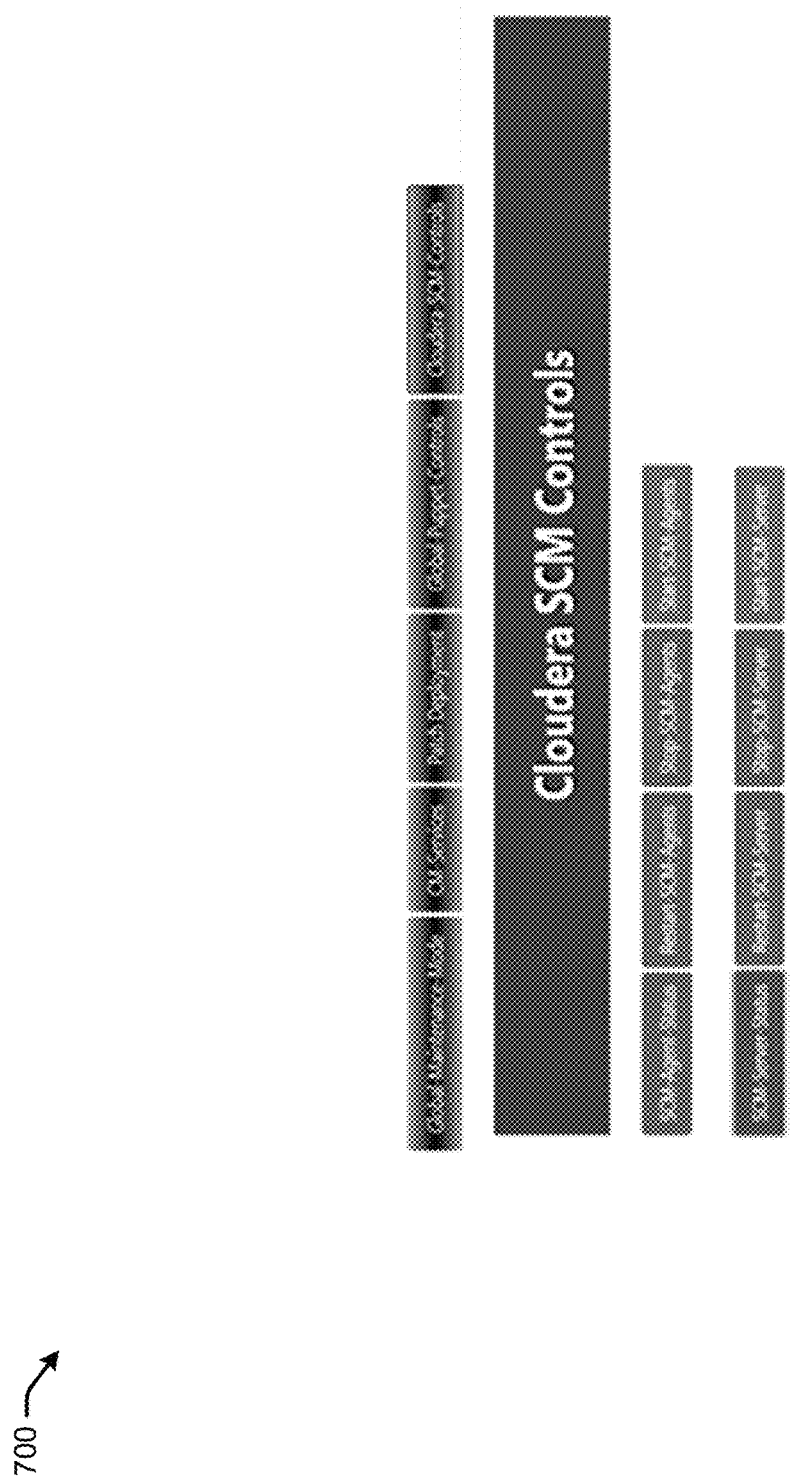

FIG. 7F illustrates a SCM agent control view of the hosted service management interface 700. The hosted service management interface 700 may configure the reporting sub-system 110 to display whether a SCM agent is running on the selected computing cluster 102, and configure a SCM agent on the selected computing cluster 102 (by calls to REST APIs or non-REST APIs, as described above) to start running, to stop running, or to restart in response to administrative personnel operating an input interface of the reporting sub-system 110 to select a SCM agent start control, a SCM agent stop control, or a SCM agent restart control, respectively.

In this fashion, the cluster health reporting engine may configure the reporting sub-system 110 to remotely start and stop computing clusters and various services running on those clusters, as well as to remotely update hosts of computing clusters, in response to administrative personnel operating an input interface of the reporting sub-system 110 to operate controls of the hosted service management interface 700. Thus, administrative personnel may enact various remedial actions upon computing clusters which may restore those computing clusters to health upon adverse health data being observed through other interfaces of the cluster health reporting engine. The hosted service management interface 700 may complement health data reported by other interfaces by enabling administrative personnel to take remedial actions appropriately.

FIGS. 8A through 8H illustrate views of a cluster health summary interface 800 according to example embodiments of the present disclosure. Broadly, the health data summary interface 800 may configure the reporting sub-system 110 to visualize reported health data for a computing cluster 102 as well as any hosted services running thereon.

Figure 8A:
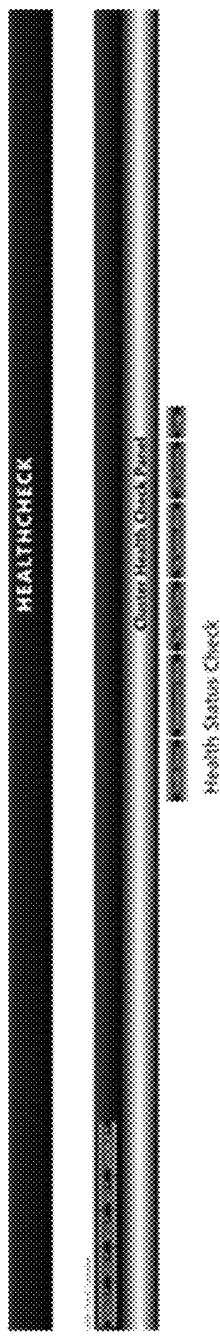

FIG. 8A illustrates a cluster selection view of the cluster health summary interface 800. The cluster health summary interface 800 may configure the reporting sub-system 110 to display one of the other views of the cluster health summary interface 800 in response to administrative personnel operating an input interface of the reporting sub-system 110 to select a computing cluster 102 among multiple, and to select a health summary to view for the selected computing cluster 102.

Figure 8B:
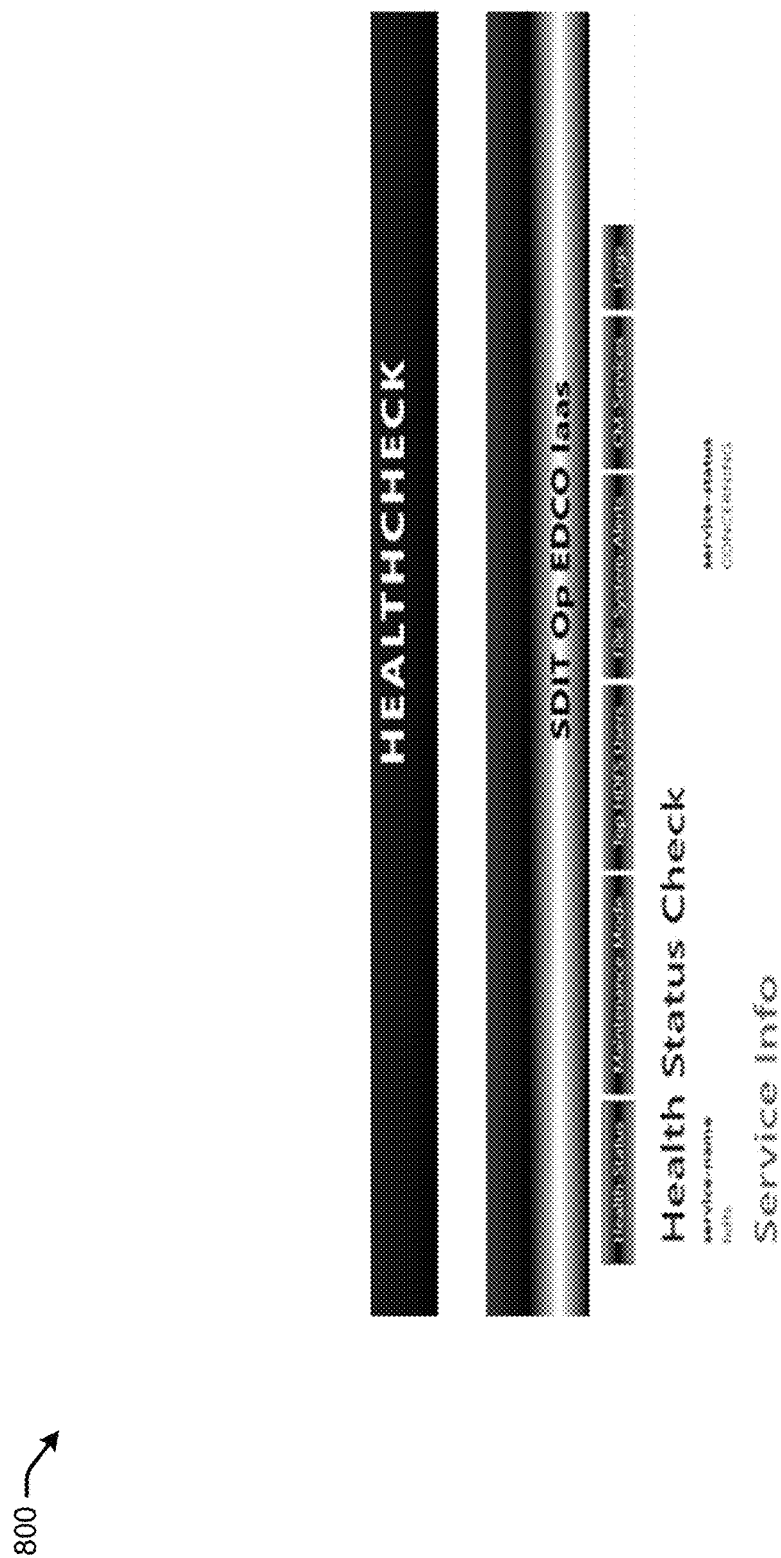

FIG. 8B illustrates a service health view of the cluster health summary interface 800. The cluster health summary interface 800 may configure the reporting sub-system 110 to display service status of a selected computing cluster 102. For example, service status may reflect whether adverse health data is present or not for hosts of the selected computing cluster 102, or may generally reflect characterization of measured values of various health data as described above.

Figure 8C:
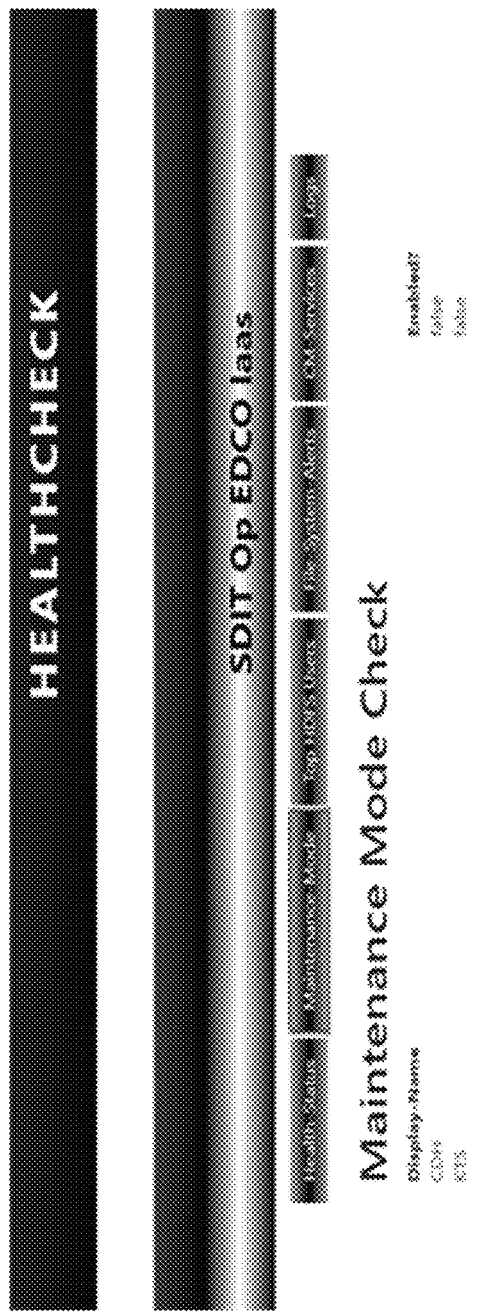

FIG. 8C illustrates a maintenance mode view of the cluster health summary interface 800. The cluster health summary interface 800 may configure the reporting sub-system 110 to display maintenance mode of a selected computing cluster 102. For example, the computing cluster 102 may run in one of several maintenance modes, or may not run in any maintenance mode.

Figure 8D:
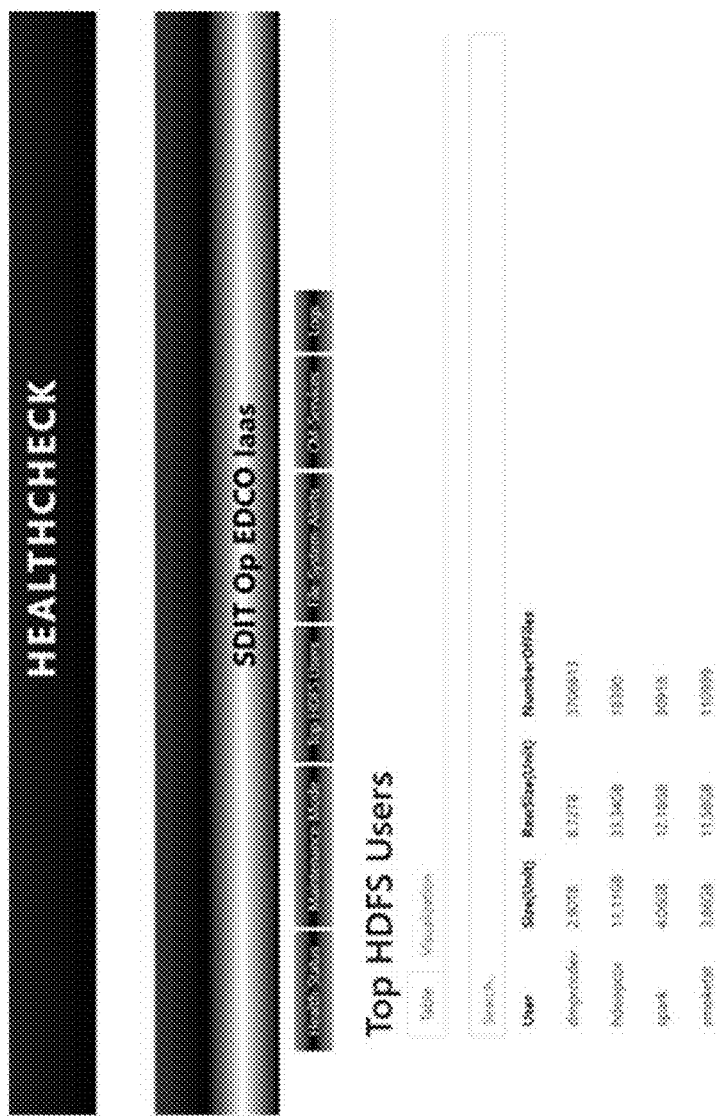

FIGS. 8D and 8E illustrate a user utilization view of the cluster health summary interface 800. The cluster health summary interface 800 may configure the reporting sub-system 110 to display storage capacity allocated to, and utilized by, each tenant user of a selected computing cluster 102, as well as number of files stored in each tenant user's consumed storage. According to FIG. 8D, this information may be visualized as a table, where stored data of each tenant user is represented as a row. According to FIG. 8E, this information may be visualized as a pie chart, where stored data of each tenant user is represented as a slice thereof.

Figure 8F:
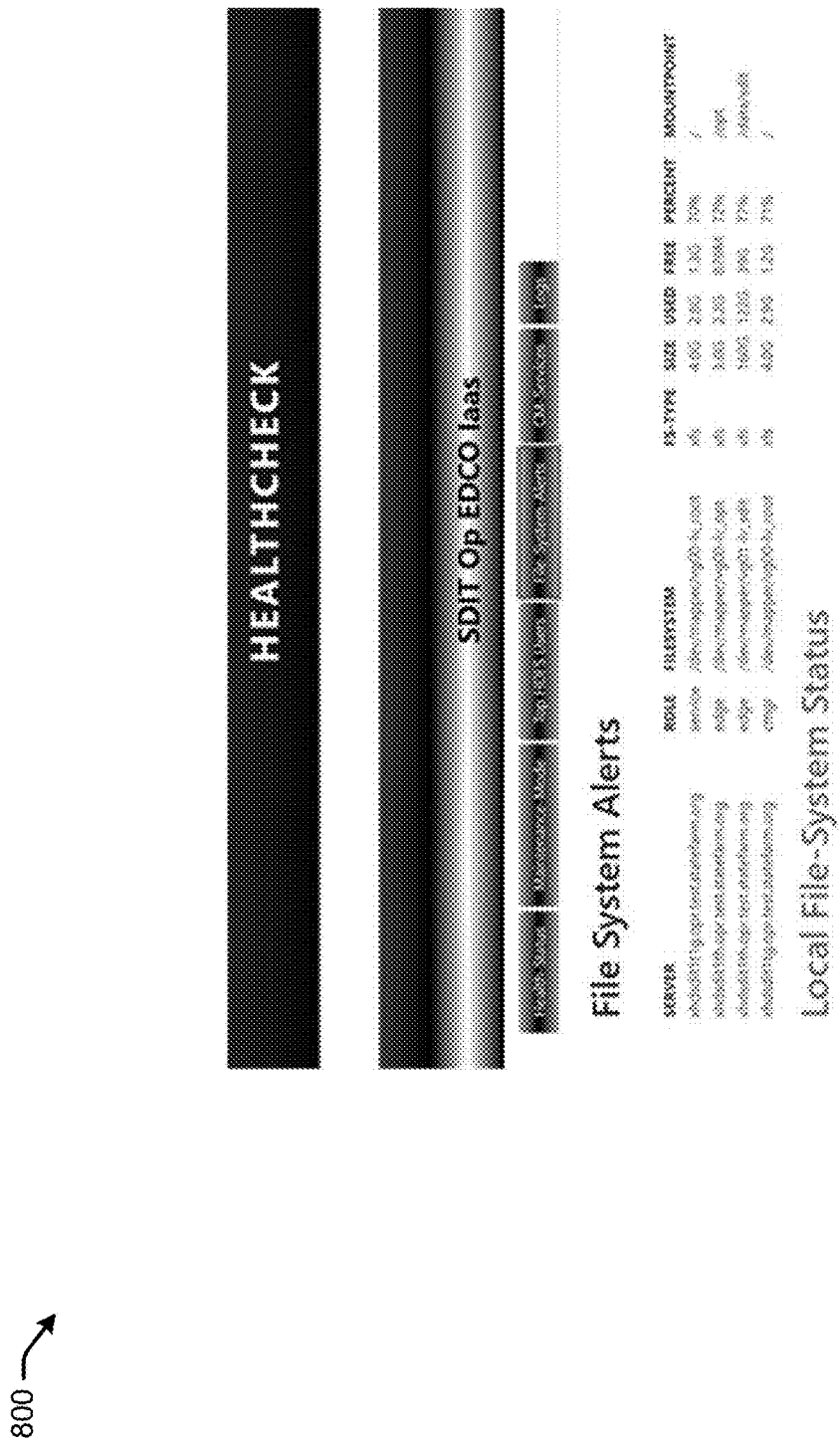

FIG. 8F illustrates a file system alerts view of the cluster health summary interface 800. The cluster health summary interface 800 may configure the reporting sub-system 110 to display a log of file system volume alerts issued at a selected computing cluster 102. A computer cluster 102 may include any number of mapped file system volumes, each of which triggers an alert upon having its respective storage capacity utilized above a certain threshold (such as an above-average capacity threshold as described above). Each logged alert may be displayed identifying the file system volume triggering the alert by server, role, file system mapping, and the like, as well as by characteristics such as file system type, capacity, utilized capacity, free capacity, percentage utilized, mount point identification, and the like.

Figure 8G:
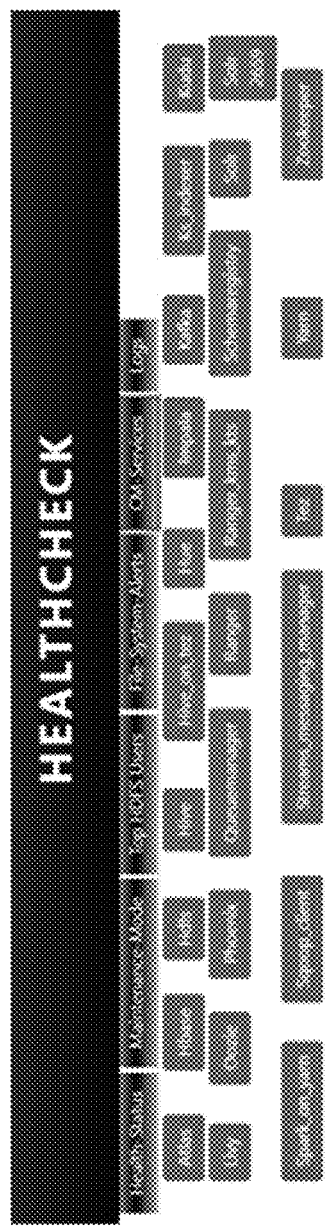
Figure 8H:
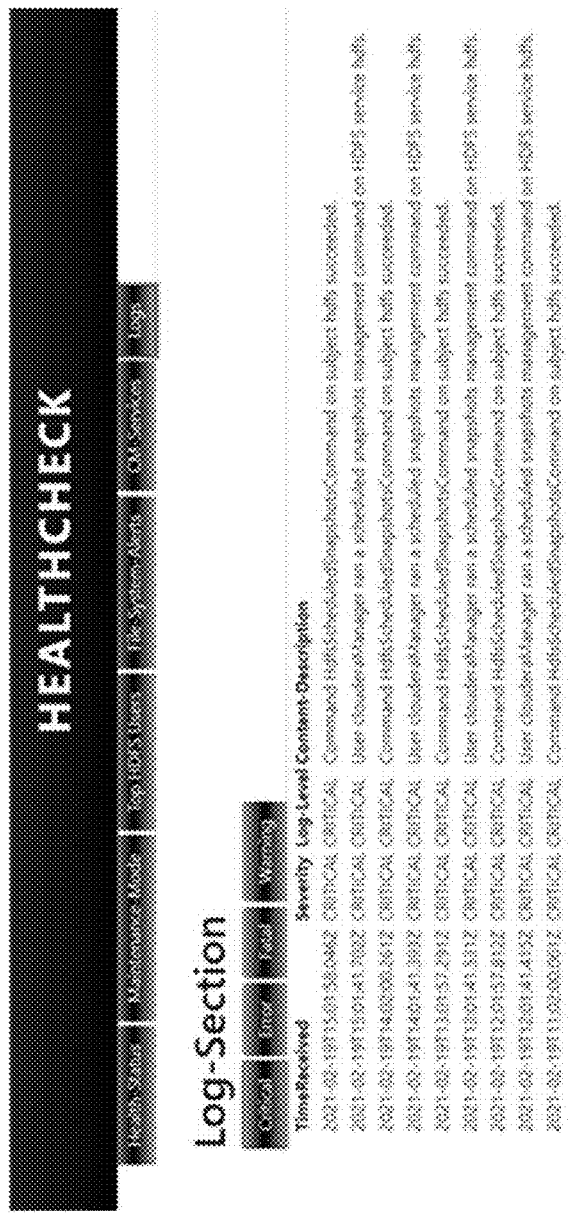

FIGS. 8G and 8H illustrate a service view of the cluster health summary interface 800. According to FIG. 8G, the cluster health summary interface 800 may configure the reporting sub-system 110 to display all services running on a selected computing cluster 102. According to FIG. 8H, the cluster health summary interface 800 may configure the reporting sub-system 110 to display one of multiple adverse health data logs for a selected service, in response to administrative personnel selecting one service among all services displayed on the cluster health summary interface 800 (according to FIG. 8G), and further selecting one log category among all log categories displayed on the cluster health summary interface 800 (according to FIG. 8H). Log categories may include, in order of decreasing severity, a fatal category (for a log of the most exceptional adverse health data incidences), a critical category, an error category, and a warning category (for a log of the least exceptional adverse health data incidences). Each log entry may be timestamped and may include a description generated by the data collection host 108. The administrative personnel may further select different log categories to toggle the log category displayed.

In this fashion, the cluster health reporting engine may configure the reporting sub-system 110 to autonomously generate compiled health data and summarize adverse health data from a data collection host 108 corresponding to a computing cluster 102, so that administrative personnel need not manually retrieve this health data on-demand. On-demand retrieval of adverse health data risks providing a limited picture of the extent of adverse health of a computing cluster, so that administrative personnel cannot take adequate remedial action until extensive adverse health data retrieval and review have been undertaken. Thus, administrative personnel may utilize the cluster health summary interface 800 in conjunction with the hosted service management interface 700 as described above, to review adverse health data and make inferences to translate the adverse health data into timely remedial actions.

Figure 9:
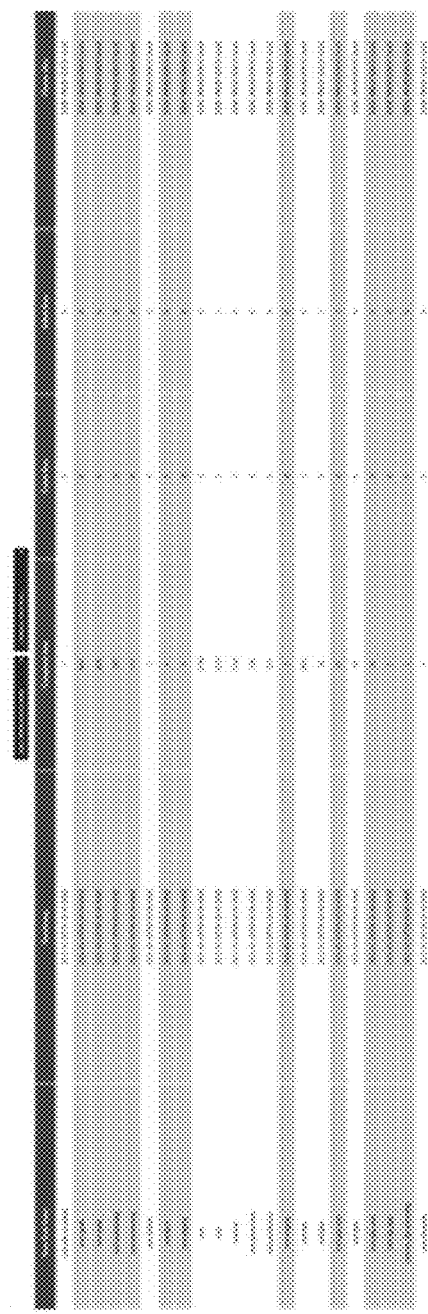
FIG. 9 illustrates a YARN job status interface according to example embodiments of the present disclosure.

FIG. 9 illustrates a YARN job status interface 900 according to example embodiments of the present disclosure. According to implementations of Hadoop® as known to persons skilled in the art, the YARN framework may further handle distributed computational workloads across hosts of a computing cluster 102 by provisioning a number of YARN pools of computational resources across the hosts. Thus, the YARN job status interface 900 may configure the reporting sub-system 110 to display YARN rates of each YARN pool of a computing cluster 102 in response to administrative personnel operating an input interface of the reporting sub-system 110 to select a computing cluster 102. YARN rates may include a rate of YARN jobs completed at each YARN pool; a rate of YARN jobs failed at each YARN pool; a rate of YARN jobs killed at each YARN pool; and the like.

In this fashion, the cluster health reporting engine may configure the reporting sub-system 110 to autonomously generate compiled health data and summarize job performance statistics across each YARN pool of a computing cluster 102. This information being provided proactively to administrative personnel may enable the administrative personnel to adjust configuration of YARN pools across the computing cluster 102 to avert possible adverse outcomes such as performance degradation, malfunctions, or failures. This information may further enable administrative personnel to better configure YARN pools for Backup Disaster Recovery ("BDR") purposes.

Figure 10:
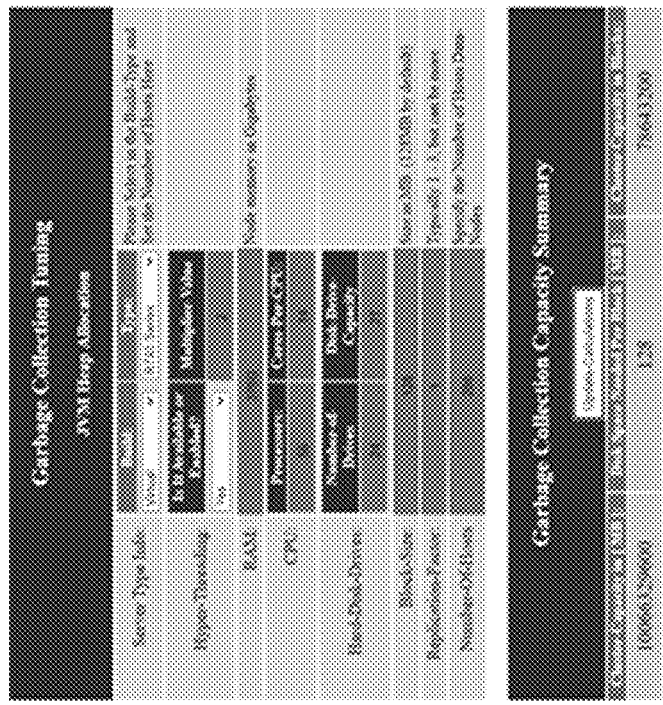
FIG. 10 illustrates a garbage collection tuning interface according to example embodiments of the present disclosure.

FIG. 10 illustrates a garbage collection tuning interface 1000 according to example embodiments of the present disclosure. The garbage collection tuning interface 1000 may configure the reporting sub-system 110 to display a selection of interactive Java Virtual Machine ("JVM®") parameter controls (each of which may correspond to an initialization parameter determining computing resources allocated to a virtual host of a computing cluster 102), and to configure JVM® instances running on the selected computing cluster 102 (by calls to REST APIs or non-REST APIs, as described above) to utilize newly defined configuration parameters in response to administrative personnel operating an input interface of the reporting sub-system 110 to define new JVM® configuration parameters using the JVM® parameter controls.

For example, JVM® configuration parameters may include server build of a virtual host, server type of a virtual host, hyperthreading availability and multiplier value, virtual memory capacity, number of virtual processors, number of cores per virtual processor, number of virtual storage devices, capacity of each virtual storage device, block size on virtual storage devices (as described above, data may be stored as logical blocks of a predetermined size), replication factor, and number of virtual hosts.

In this fashion, administrative personnel may configure hosts of a computing cluster 102 so that JVM® configuration parameters satisfy heap allocation requirements of a JVM® garbage collector. The proper functioning of a JVM® garbage collector on hosts of a computing cluster 102 may need to be satisfactorily configured to ensure the ongoing health of YARN pools for carrying out YARN jobs, as previously described with reference to FIG. 9. Thus, the YARN job status interface 900 and the garbage collection tuning interface 1000 may be operated jointly by administrative personnel, such that the cluster health reporting engine provides administrative personnel with the means to observe YARN pool health and re-configure hosts of the computing cluster 102 to ensure ongoing YARN pool health.

Figure 11:
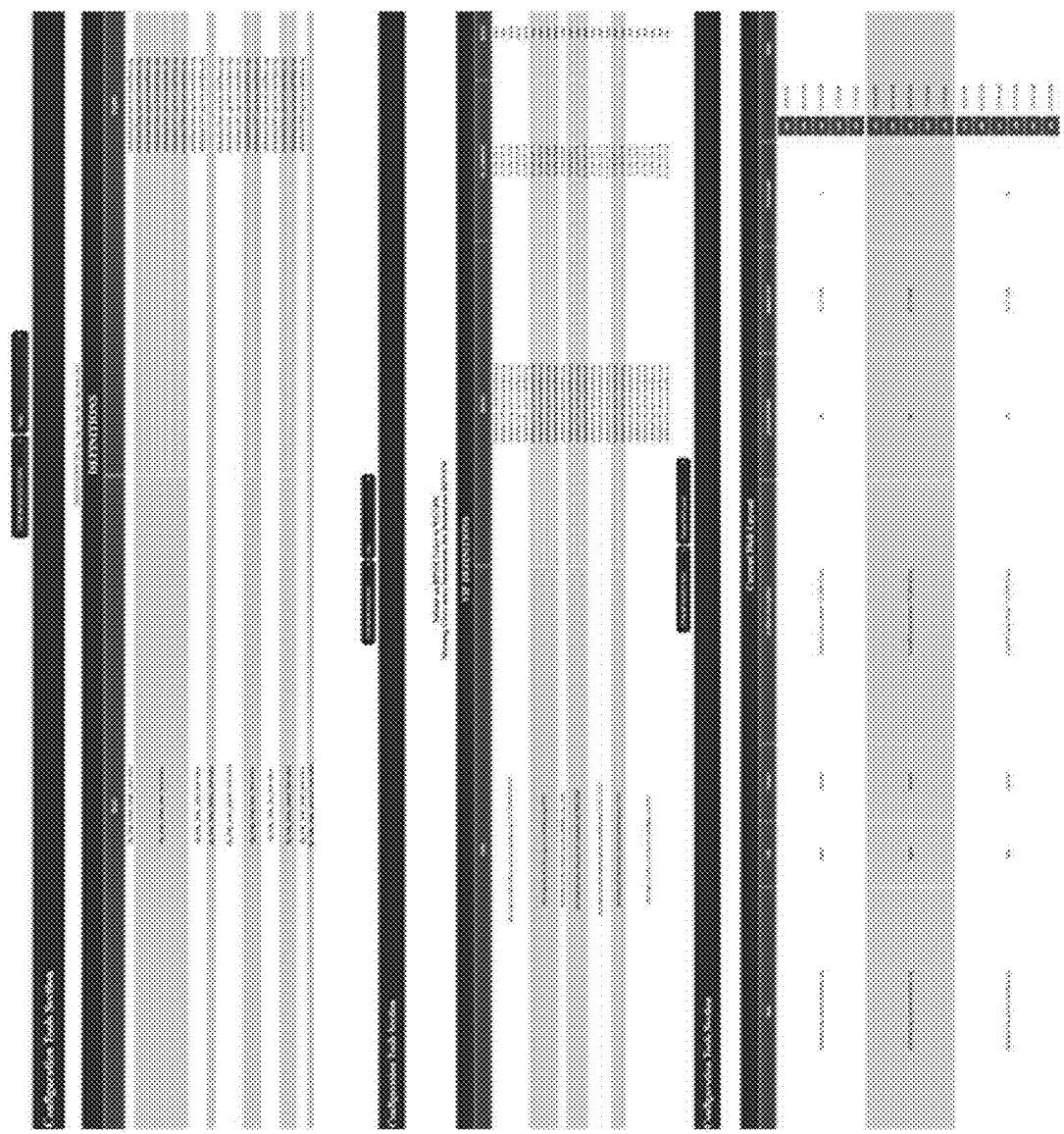
FIG. 11 illustrates a cluster build configuration interface according to example embodiments of the present disclosure.

FIG. 11 illustrates a cluster build configuration interface 1100 according to example embodiments of the present disclosure. According to implementations of Hadoop® as known to persons skilled in the art, a computing cluster 102 may be configured according to a DAGS configuration, a Virtual IP ("VIP") service configuration (wherein certain hosts of the computing cluster 102 may have virtual IP address mapped thereto), and a storage layout configuration (wherein storage of the computing cluster 102 may be organized into volumes, partitions, and the like). The cluster build configuration interface 1100 may configure the reporting sub-system to display a DAGS configuration, a VIP service configuration, and storage layout configuration, each of which was originally used to build the computing cluster 102.

In this fashion, the cluster health reporting engine may equip administrative personnel to easily review a comprehensive summary of configuration information used to build a computing cluster 102, and thereby quickly grasp fundamental infrastructure information of the computing cluster 102. This information may be relevant to contextualizing adverse health data reported by other interfaces of the cluster health reporting engine.

Figure 12:
FIG. 12 illustrates a hardware configuration summary interface according to example embodiments of the present disclosure.

FIG. 12 illustrates a hardware configuration summary interface 1200 according to example embodiments of the present disclosure. Ultimately, hosts of a computing cluster 102 run on physical hardware, including a motherboard running a BIOS, physical processors, and the like. The hardware configuration summary interface 1200 may configure a reporting sub-system 110 to display summaries of parameters of an underlying physical computing system; parameters of a motherboard; parameters of a BIOS running on the motherboard; parameters of one or more processors installed on the motherboard; and the like in response to administrative personnel operating an input interface of the reporting sub-system 110 to select a series of narrowing parameters. It may be seen on FIG. 12 that narrowing parameters include a cluster region, a server role, and a server node identifying each computing cluster 102.

For example, with regard to one or more processors installed on the motherboard, the hardware configuration summary interface 1200 may configure a reporting sub-system 110 to display a processor architecture; a processor op-mode; a processor byte order; a processor count; a processor core count; a processor thread count (i.e., per core); a processor frequency; a processor virtualization type; a processor cache capacity; and the like.

In this fashion, the cluster health reporting engine may provide administrative personnel with hardware architecture context underlying a computing cluster, to better inform evaluations of adverse health data and determinations of remedial actions.

Figure 13:
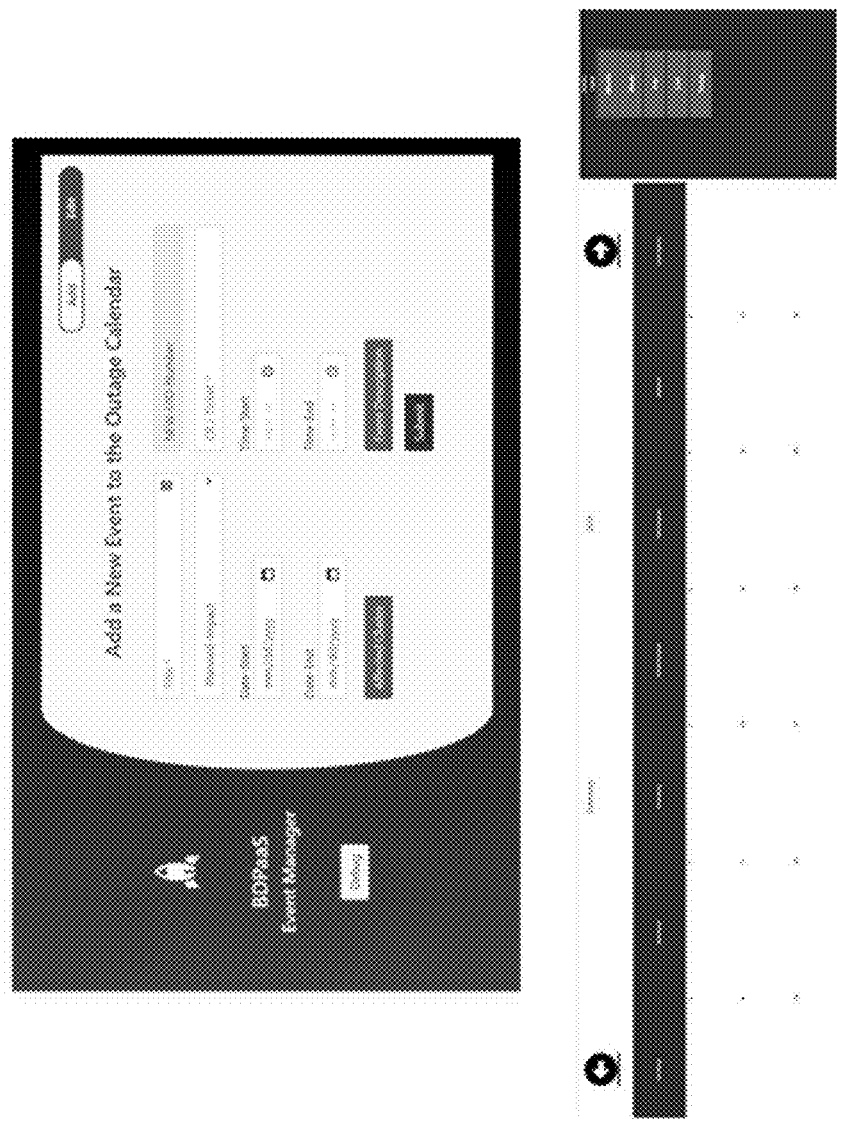
FIG. 13 illustrates a calendar interface according to example embodiments of the present disclosure.

FIG. 13 illustrates a calendar interface 1300 according to example embodiments of the present disclosure. The calendar interface 1300 may configure a reporting sub-system 110 to set an adverse calendar event, which may be scheduled for a start time, an end time, a start date, and an end date, in a calendar system in response to administrative personnel interacting with an input interface of the reporting sub-system 110 to record an adverse calendar event. The calendar system running on the reporting sub-system 110 may be configured to notify operators of the reporting sub-system 110 regarding the occurrence of adverse calendar events.

In this fashion, the cluster health reporting engine may provide time-based tracking of adverse events which are anticipated by administrative personnel to cause failures of computing clusters 102, due to scheduled system outages and the like. The cluster health reporting engine may further provide time-based tracking of uncontrollable events which are anticipated to possibly cause failures of computing clusters 102, such as periods of expected high network traffic which need not necessarily result in failure of computer clusters 102. Thus, administrative personnel are provided with an additional tool for tracking factors which may directly or proximately lead to performance degradation, malfunction or failures of computing clusters 102.

Figure 14:
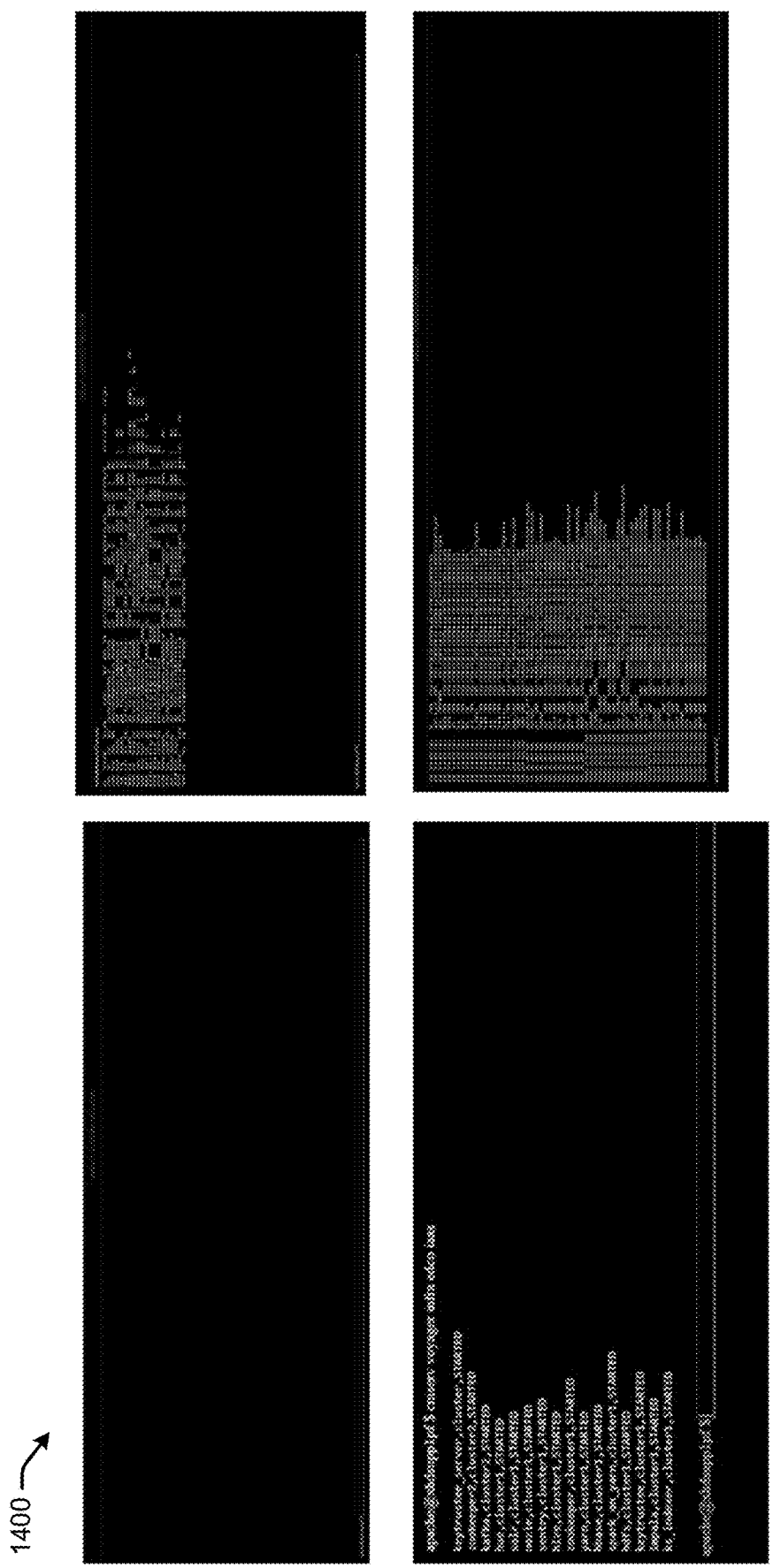
FIG. 14 illustrates a console interface according to example embodiments of the present disclosure.

FIG. 14 illustrates a console interface 1400 according to example embodiments of the present disclosure. The console interface 1400 may configure a reporting sub-system 110 to provide a command-line terminal, such that in response to administrative personnel operating an input interface of the reporting sub-system 110 to input command-line instructions (such as Secure Shell ("SSH") commands), which may substitute for manually interacting with interfaces of the cluster health reporting engine as described above with reference to FIGS. 2 through 14.

In this fashion, the cluster health reporting engine may provide administrative personnel with more options for retrieving health data and inputting configuring commands and remediating commands to be enacted upon computing clusters 102.

Figure 15:
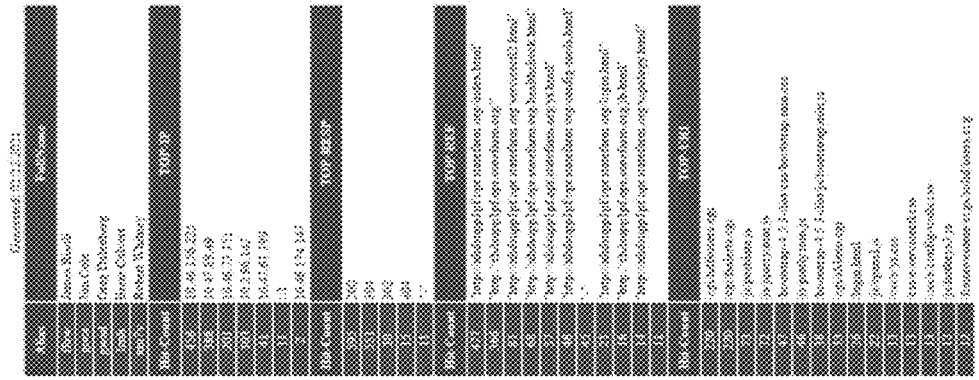
FIG. 15 illustrates a network analytics interface according to example embodiments of the present disclosure.

FIG. 15 illustrates a network analytics interface 1500 according to example embodiments of the present disclosure. The network analytics interface 1500 may configure a reporting sub-system 110 to display summaries of parameters of users who have accessed the computing clusters 102; most frequent IP addresses accessed by network requests among those assigned to the computing clusters 102; most frequent HTTP response status codes returned by the computing clusters 102 in response to HTTP requests; most frequent URL resources requested; most frequent URI resources requested; and the like.

In this fashion, the cluster health reporting engine may summarize contextual network activity, enabling administrative personnel to access additional background information for evaluating adverse health data and determining remedial actions to be taken.

Figure 16:
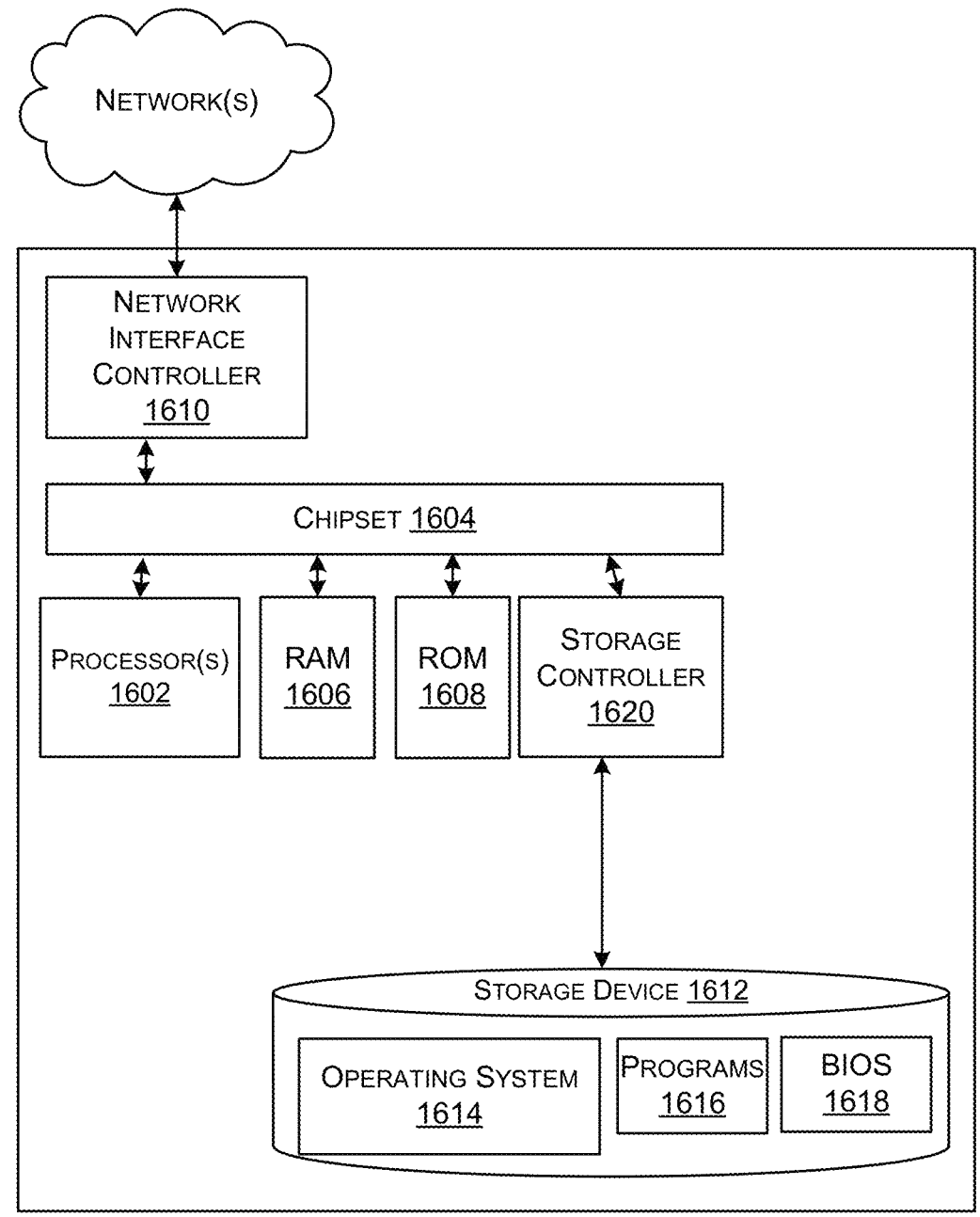
FIG. 16 illustrates an example system architecture of a computing system configured to run a cluster health reporting engine according to example embodiments of the present disclosure.

FIG. 16 illustrates an example system architecture of a computing system 1600 configured to run a cluster health reporting engine according to example embodiments of the present disclosure.

According to example embodiments of the present disclosure, a computing system 1600 may include any number of processor(s) 1602. The processor(s) 1602 may be physical processors and/or may be virtual processors, and may include any number of physical and/or virtual cores. The processor(s) 1602 may each be configured to execute one or more instructions stored on a computer-readable storage medium, such as interfaces of a cluster health reporting engine as described above, to cause the processor(s) 1602 to compute tasks such as retrieving adverse health data and sending configuring commands and remediation commands as described above.

The processor(s) 1602 may perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

A computing system 1600 may further include a system memory communicatively coupled to the processor(s) 1602 by a data bus 1608 as described above. The system memory 1606 may be physical or may be virtual, and may be distributed amongst any number of nodes and/or clusters. The system memory 1606 may be volatile, such as RAM, non-volatile, such as ROM, flash memory, miniature hard drive, memory card, and the like, or some combination thereof.

In one illustrative configuration, the processor(s) 1602 operate in conjunction with a chipset 1604. The chipset 1604 provides an interface between the processor(s) 1602 and the remainder of the components and devices of the computing system 1600. The chipset 1604 can provide an interface to a RAM 1606, used as the main memory in the computing system 1600. The chipset 1604 can further provide an interface to a computer-readable storage medium such as a read-only memory ("ROM") 1608 or non-volatile RAM ("NVRAM") for storing basic routines that help to startup the computing system 500 and to transfer information between the various components and devices. The ROM 1608 or NVRAM can also store other software components necessary for the operation of the computing system 1600 in accordance with the configurations described herein.

The computing system 1600 may operate in a networked environment using logical connections to remote computing devices and computer systems through a network. The chipset 1604 may include functionality for providing network connectivity through a NIC 1610, such as a gigabit Ethernet adapter. The NIC 1610 is capable of connecting the computing system 1600 to other computing devices over a network. It should be appreciated that multiple NICs 1610 may be present in the computing system 1600, connecting the computing system 1600 to other types of networks and remote computer systems.

The computing system 1600 may be connected to a storage device 1612 that provides non-volatile storage for the computing system 1600. The storage device 1612 may store an operating system 1614, programs 1616, a BIOS, and data, which have been described in greater detail herein. The storage device 1612 may be connected to the computing system 1600 through a storage controller 1618 connected to the chipset 1604. The storage device 1612 may consist of one or more physical storage units. The storage controller 1618 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing system 1600 may store data on the storage device 1612 by transforming the physical state of the physical storage units to reflect the information being stored. The specific transformation of physical state may depend on various factors, in different embodiments of this description. Examples of such factors may include, but are not limited to, the technology used to implement the physical storage units, whether the storage device 1612 is characterized as primary or secondary storage, and the like.

For example, the computing system 1600 may store information to the storage device 1612 by issuing instructions through the storage controller 1618 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing system 1600 may further read information from the storage device 1612 by detecting the physical states or characteristics of one or more particular locations within the physical storage units.

In addition to the storage device 1612 described above, the computing system 1600 may have access to other computer-readable storage media to store and retrieve information, such as program modules, data structures, or other data. It should be appreciated by those skilled in the art that computer-readable storage media is any available media that provides for the non-transitory storage of data and that may be accessed by the computing system 1600. In some examples, the operations performed by a router node of the network overlay, and or any components included therein, may be supported by one or more devices similar to the computing system 1600. Stated otherwise, some or all of the operations performed for computing rule engines may be performed by one or more computing systems 1600 operating in a networked, distributed arrangement over one or more logical planes over one or more networks.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 1612 may store an operating system 1614 utilized to control the operation of the computing system 1600. According to one embodiment, the operating system comprises the LINUX operating system and derivatives thereof. According to another embodiment, the operating system comprises the WINDOWS operating system from MICROSOFT CORPORATION of Redmond, Washington. It should be appreciated that other operating systems may also be utilized. The storage device 1612 may store other system or application programs and data utilized by the computing system 1600.

In one embodiment, the storage device 1612 or other computer-readable storage media is encoded with computer-executable instructions which, when loaded into a computer, transform the computer from a general-purpose computing system into a special-purpose computer capable of implementing the embodiments described herein. These computer-executable instructions transform the computing system 1600 by specifying how the processor(s) 1602 transition between states, as described above. According to one embodiment, the computing system 1600 has access to computer-readable storage media storing computer-executable instructions which, when executed by the computing system 1600, perform the various processes described above with regard to FIGS. 1-15. The computing system 1600 may also include computer-readable storage media having instructions stored thereupon for performing any of the other computer-implemented operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system, comprising:
   one or more processors; and one or more non-transitory computer-readable media storing computer-executable instructions that, when executed by the one or more processors, cause the one or more processors to:
receive, from a first data collection host of a plurality of hosts, first health data,
wherein:
  the plurality of hosts comprises a plurality of hosts of a first remote computing cluster hosting a distributed file system,
  the first health data is associated with health of the plurality of hosts of the first remote computing cluster,
  the first health data is received while tracking the health of the plurality of hosts of the first remote computing cluster; and
  the first health data includes results of at least one of a binary test or a metric test,
  wherein the binary test configures the first data collection host to determine a failure of one or more of the plurality of hosts of the first remote computing cluster, and
  wherein the metric test configures the first data collection host to measure behavior of one or more of the plurality of hosts of the first remote computing cluster according to a numerical scale;
display, on an output interface, at least a portion of the first health data; receive, from a particular host of the plurality of hosts of the first remote computing cluster, and by calling a representational state transfer (REST) application programming (API), a host configuration file associated with the particular host;
parse one or more configuration parameters of the host configuration file; generate compiled health data of the particular host from the first health data in response to search parameters being input into a search interface at an input interface;
display, on the output interface, at least a portion of the compiled health data of the particular host;
responsive at least in part to generating the compiled health data and parsing the one or more configuration parameters, generate an edited host configuration file associated with the particular host;
send, by calling the REST API, the edited host configuration file to the particular host, wherein sending the edited host configuration file causes the particular host to operate in accordance with updated configuration parameters of the edited host configuration file; and
display, on the output interface, second health data of a plurality of hosts of a second remote computing cluster in response to a switching control being activated at the input interface or another input interface, wherein the second health data is returned from a second data collection host during tracking of the second health data.

2. The system of claim 1, wherein the instructions further cause the one or more processors to display, on the output interface, a plurality of service capacity gauges, each indicating a hosted service or sub-service of the distributed file system, and each visualizing utilized storage capacity by the hosted service or sub-service as one or more segments within allocated storage capacity.

3. The system of claim 1, wherein the instructions further cause the one or more processors to visualize a parameter editing view of the host configuration file, in response to narrowing parameters being input into a configuration retrieval and editing interface at the input interface.

4. The system of claim 3, wherein the instructions further cause the one or more processors to send the edited host configuration file to other hosts of the plurality of hosts of the first remote computing cluster.

5. The system of claim 1, wherein the instructions further cause the one or more processors to display how many hosts, among all hosts of the first remote computing cluster, are running a fully updated BIOS, and how many hosts, among all hosts of the first remote computing cluster, are running a fully updated OS.

6. The system of claim 1, wherein the instructions further cause the one or more processors to display one of a plurality of adverse health data logs for a selected service among all services running on the first remote computing cluster.

7. A method comprising:
receiving, from a first data collection host of a plurality of hosts, first health data, wherein:
  the plurality of hosts comprises a plurality of hosts of a first remote computing cluster hosting a distributed file system,
  the first health data is associated with health of the plurality of hosts of the first remote computing cluster,
the first health data is received while tracking the health of the plurality of hosts of the first remote computing cluster; and
the first health data includes results of at least one of a binary test or a metric test, wherein the binary test configures the first data collection host to determine a failure of one or more of the plurality of hosts of the first remote computing cluster, and wherein the metric test configures the first data collection host to measure behavior of one or more of the plurality of hosts of the first remote computing cluster according to a numerical scale;
  receiving, from a particular host of the plurality of hosts of the first remote computing cluster, and by calling a representational state transfer (REST) application programming (API), a host configuration file associated with the particular host;
  parsing one or more configuration parameters of the host configuration file; displaying, by an output interface of a reporting system, at least a portion of the first health data;
  generating, by the reporting system, compiled health data of the particular host from the first health data in response to search parameters being input into a search interface at an input interface;
  displaying, by the output interface of the reporting system, at least a portion of the compiled health data of the particular host;
  responsive at least in part to generating the compiled health data and parsing the one or more configuration parameters, generating an edited host configuration file associated with the particular host;
  sending, by calling the REST API, the edited host configuration file to the particular host, wherein sending the edited host configuration file causes the particular host to operate in accordance with updated configuration parameters of the edited host configuration file; and
  displaying, by the output interface of the reporting system, second health data of a plurality of hosts of a second remote computing cluster in response to a switching control being activated at the input interface or another input interface, wherein the second health data is returned from a second data collection host during tracking of the second health data.

8. The method of claim 7, further comprising displaying, on the output interface, a plurality of service capacity gauges, each indicating a hosted service or sub-service of the distributed file system, and each visualizing utilized storage capacity by the hosted service or sub-service as one or more segments within allocated storage capacity.

9. The method of claim 7, further comprising visualizing a parameter editing view of the host configuration file, in response to narrowing parameters being input into a configuration retrieval and editing interface at the input interface.

10. The method of claim 9, further comprising sending the edited host configuration file to other hosts of the plurality of hosts of the first remote computing cluster.

11. The method of claim 7, further comprising displaying how many hosts, among all hosts of the first remote computing cluster, are running a fully updated BIOS, and how many hosts, among all hosts of the first remote computing cluster, are running a fully updated OS.

12. The method of claim 7, further comprising displaying one of a plurality of adverse health data logs for a selected service among all services running on the first remote computing cluster.

13. A computer-readable storage medium storing computer-readable instructions executable by one or more processors, that when executed by the one or more processors, cause the one or more processors to perform operations comprising:
   receiving, from a first data collection host of a plurality of hosts, first health data, wherein:
      the plurality of hosts comprises a plurality of hosts of a first remote computing cluster hosting a distributed file system,
      the first health data is associated with health of the plurality of hosts of the first remote computing cluster,
   the first health data is received while tracking the health of the plurality of hosts of the first remote computing cluster; and
   the first health data includes results of at least one of a binary test or a metric test,
      wherein the binary test configures the first data collection host to determine a failure of one or more of the plurality of hosts of the first remote computing cluster, and
      wherein the metric test configures the first data collection host to measure behavior of one or more of the plurality of hosts of the first remote computing cluster according to a numerical scale;
   displaying, by an output interface of a reporting system, at least a portion of the first health data;
   receiving, from a particular host of the plurality of hosts of the first remote computing cluster, and by calling a representational state transfer (REST) application programming (API), a host configuration file associated with the particular host; parsing one or more configuration parameters of the host configuration file;
   generating, by the reporting system, compiled health data of the particular host from the first health data in response to search parameters being input into a search interface at an input interface;
   displaying, by the output interface of the reporting system, at least a portion of the compiled health data of the particular host;
   responsive at least in part to generating the compiled health data and parsing the one or more configuration parameters, generating an edited host configuration file associated with the particular host;
   sending, by calling the REST API, the edited host configuration file to the particular host, wherein sending the edited host configuration file causes the particular host to operate in accordance with updated configuration parameters of the edited host configuration file; and
   displaying, by the output interface of the reporting system, second health data of a plurality of hosts of a second remote computing cluster in response to a switching control being activated at the input interface or another input interface, wherein the second health data is returned from a second data collection host during tracking of the second health data.

14. The computer-readable storage medium of claim 13, wherein the operations further comprise displaying, on the output interface of the reporting system, a plurality of service capacity gauges, each indicating a hosted service or sub-service of the distributed file system, and each visualizing utilized storage capacity by the hosted service or sub-service as one or more segments within allocated storage capacity.

15. The computer-readable storage medium of claim 13, wherein the operations further comprise visualizing a parameter editing view of the host configuration file, in response to narrowing parameters being input into a configuration retrieval and editing interface at the input interface.

16. The computer-readable storage medium of claim 15, wherein the operations further comprise sending the edited host configuration file to other hosts of the plurality of hosts of the first remote computing cluster.

17. The computer-readable storage medium of claim 13, wherein the operations further comprise displaying one of a plurality of adverse health data logs for a selected service among all services running on the first remote computing cluster.

* * * * *